US010534871B2

(12) United States Patent
Pomerantz et al.

(10) Patent No.: US 10,534,871 B2
(45) Date of Patent: Jan. 14, 2020

(54) METHOD AND SYSTEMS FOR RESERVOIR MODELING, EVALUATION AND SIMULATION

(75) Inventors: Andrew E. Pomerantz, Lexington, MA (US); Youxiang Zuo, Edmonton (CA); John Waggoner, Katy, TX (US); Zulfiquar Ail Reza, Abu Dhabi (AE); Sophie Nazik Godefroy, Abingdon (GB); Thomas Pfeiffer, Molbergen (DE); Denise E. Freed, Newton Highlands, MA (US); Oliver C. Mullins, Ridgefield, CT (US)

(73) Assignee: Schlumberger Technology Corporation, Sugar Land, TX (US)

( * ) Notice: Subject to any disclaimer, the term of this patent is extended or adjusted under 35 U.S.C. 154(b) by 1528 days.

(21) Appl. No.: 13/043,773

(22) Filed: Mar. 9, 2011

(65) Prior Publication Data

US 2012/0232859 A1      Sep. 13, 2012

(51) Int. Cl.
*G06F 17/50*  (2006.01)
*G01V 1/28*   (2006.01)
(Continued)

(52) U.S. Cl.
CPC .......... *G06F 17/5009* (2013.01); *G01V 1/282* (2013.01); *E21B 49/00* (2013.01);
(Continued)

(58) Field of Classification Search
CPC .. E21B 49/00; G01V 2210/644; G01V 1/282; G01V 99/005; G01V 2210/663; G06F 17/5018; G06F 2217/16; G06F 17/5009
See application file for complete search history.

(56) References Cited

U.S. PATENT DOCUMENTS 5,795,850 A * 8/1998 Thorssen et al. ............. 507/203
5,992,519 A   11/1999 Ramakrishnan et al.
(Continued)

FOREIGN PATENT DOCUMENTS

WO    99/64896 A1   12/1999
WO  2004/049216 A1   6/2004

OTHER PUBLICATIONS

"Unstructured 3D Gridding and Upscaling for Coarse Modeling of Geometrically Complex Reservoirs" by M. Prevost et al (Presented in 9th European Conference on the Mathematics of Oil Recovery—Cannes, France, Aug. 30-Sep. 2, 2004 pp. 1-8).*
(Continued)

*Primary Examiner* — Akash Saxena
(74) *Attorney, Agent, or Firm* — Mitchell M. Blakely

(57) ABSTRACT

Fluid property modeling that employs a model that characterizes asphaltene concentration gradients is integrated into a reservoir modeling and simulation framework to allow for reservoir compartmentalization (the presence or absence of flow barrier in the reservoir) to be assessed more quickly and easily. Additionally, automated integration of the fluid property modeling into the reservoir modeling and simulation framework allows the compositional gradients produced by the fluid property modeler (particularly asphaltene concentration gradients) to be combined with other data, such as geologic data and other petrophysical data, which allows for more accurate assessment of reservoir compartmentalization.

51 Claims, 8 Drawing Sheets

(51) Int. Cl.
G01V 99/00 (2009.01)
E21B 49/00 (2006.01)
(52) U.S. Cl.
CPC ...... G01V 99/005 (2013.01); G01V 2210/644 (2013.01); G01V 2210/663 (2013.01); G06F 17/5018 (2013.01)

(56) References Cited

U.S. PATENT DOCUMENTS

| | | | |
|---|---|---|---|
| 6,018,497 | A | 1/2000 | Gunasekera |
| 6,106,561 | A | 8/2000 | Farmer |
| 6,230,101 | B1 | 5/2001 | Wallis |
| 6,313,837 | B1 | 11/2001 | Assa et al. |
| 6,467,340 | B1 * | 10/2002 | Gallagher et al. ......... 73/152.18 |
| 6,801,197 | B2 | 10/2004 | Sanstrom |
| 6,826,520 | B1 | 11/2004 | Khan et al. |
| 6,980,940 | B1 * | 12/2005 | Gurpinar ................ E21B 43/00 166/250.16 |
| 7,248,259 | B2 | 7/2007 | Fremming |
| 7,379,819 | B2 * | 5/2008 | Betancourt et al. ............ 702/11 |
| 7,822,554 | B2 * | 10/2010 | Zuo et al. ........................ 175/40 |
| 7,996,154 | B2 * | 8/2011 | Zuo et al. ........................ 702/11 |
| 8,271,248 | B2 * | 9/2012 | Pomerantz et al. ............ 703/10 |
| 2002/0053430 | A1 * | 5/2002 | Curtis et al. ............ 166/250.01 |
| 2003/0216897 | A1 | 11/2003 | Endres et al. |
| 2004/0220846 | A1 | 11/2004 | Cullick et al. |
| 2005/0021234 | A1 * | 1/2005 | Han ................................ 702/13 |
| 2005/0149307 | A1 | 7/2005 | Gurpinar et al. |
| 2005/0165554 | A1 * | 7/2005 | Betancourt et al. ............ 702/11 |
| 2006/0036418 | A1 | 2/2006 | Pita et al. |
| 2006/0155472 | A1 * | 7/2006 | Venkataramanan et al. ... 702/10 |
| 2006/0197759 | A1 | 9/2006 | Fremming |
| 2006/0282243 | A1 | 12/2006 | Childs et al. |
| 2007/0276639 | A1 * | 11/2007 | Montaron et al. ............. 703/10 |
| 2008/0040051 | A1 * | 2/2008 | Franklin et al. ................ 702/30 |
| 2008/0040086 | A1 * | 2/2008 | Betancourt et al. ............ 703/10 |
| 2009/0192768 | A1 * | 7/2009 | Zuo et al. .......................... 703/2 |
| 2009/0248310 | A1 * | 10/2009 | Zuo et al. ........................ 702/11 |
| 2009/0288881 | A1 * | 11/2009 | Mullins et al. ................. 175/50 |
| 2009/0312997 | A1 * | 12/2009 | Freed et al. ..................... 703/10 |
| 2010/0004914 | A1 | 1/2010 | Lukyanov et al. |
| 2010/0076740 | A1 * | 3/2010 | Kuchuk et al. ................. 703/10 |
| 2010/0132450 | A1 | 6/2010 | Pomerantz et al. |
| 2011/0088895 | A1 * | 4/2011 | Pop et al. ................... 166/254.2 |
| 2011/0246143 | A1 * | 10/2011 | Pomerantz et al. ............... 703/2 |
| 2011/0308790 | A1 * | 12/2011 | Strapoc et al. .......... 166/250.01 |
| 2012/0109611 | A1 * | 5/2012 | Loizzo et al. ................... 703/10 |
| 2012/0147704 | A1 * | 6/2012 | Xian et al. ....................... 367/73 |
| 2012/0232799 | A1 | 9/2012 | Zuo et al. |
| 2012/0232859 | A1 * | 9/2012 | Pomerantz et al. ............... 703/2 |
| 2012/0296617 | A1 * | 11/2012 | Zuo et al. ........................ 703/10 |
| 2016/0161635 | A1 * | 6/2016 | Ramsay ............... G01V 99/005 703/9 |

OTHER PUBLICATIONS

Alboudwarej, H. et al., "Effective Tuning of Wax Thermodynamic Models," 7th International Conference on Petroleum Phase Behavior and Fouling, Poster Abstract 1, Jun. 26, 2006, Asheville, North Carolina, USA.
Zuo, Youxiang (Jullan), et al., "Methods and Apparatus for Characterization of Petroleum Fluids Contaminated with Drilling Mud," U.S. Utility U.S. Appl. No. 12/990,980, filed Dec. 10, 2010.
Zuo, Youxiang (Jullan), et al., "Integration of Asphaltene Molar Distribution Functions to Asphaltene/Color Log Predictions for Determination of Reservoir Connectivity," U.S. Appl. No. 61/225,014, filed Jul. 13, 2009.
Zuo, Youxiang (Jullan), et al., "Interpretation of Dfa Color Gradients in Oil Columns Using The Flory-Huggins Solubility Model," U.S. Appl. No. 61/306,642, filed Feb. 22, 2010.
Zuo, Youxiang (Jullan), et al., "Determination of Reservoir Connectivity Using Non-Equilibrium Compositional Gradients," U.S. Appl. No. 61/282,244, filed Jan. 7, 2010.
Zuo, Youxiang (Jullan), et al., "Determination of Reservoir Connectivity Using Non-Equilibrium Compositional Gradients," U.S. Appl. No. 61/387,066, filed Sep. 28, 2010.
Pomerantz, Andrew, et al., "Methods and Apparatus for Characterization of Petroleum Fluids and Applications Thereof," Utility U.S. Appl. No. 12/752,967,filed Apr. 1, 2010.
Zuo, Youxiang (Jullan), et al., "Integration of DFA Color Analysis and Asphaltene Instability in Hydrocarbon Reservoirs," U.S. Appl. No. 61/332,595, filed May 7, 2010.
Wen et al., "Upscaling Hydraulic Conductivities in Heterogeneous Media: An Overview," Journal of Hydrology, 1996, pp. 9-32, vol. 183, Elsevier.
Begg et al., "Assigning Effective Values to Simulator Gridblock Parameters for Heterogeneous Reservoirs," SPE Reservoir Engineering, Nov. 1989, pp. 455-465.
Durlofsky et al., "Scale Up of Heterogeneous Three Dimensional Reservoir Descriptions," SPE Journal, Paper SPE 30709 presented at the Annual Technical Conference and Exhibition, Oct. 22-25, 1995, pp. 313-326, Dallas, Texas, USA.
Li et al., "Global Scale-up of Reservoir Model Permeability with Local Grid Refinement", Journal of Petroleum Science and Engineering, 1995, pp. 1-13, vol. 14, Elsevier.
Prevost, M. et al., "Unstructured 3D Gridding and Upscaling for Coarse Modeling of Geometrically Complex Reservoirs," Petroleum Geoscience, Oct. 2005, pp. 339-345, v. 11; No. 4.
Lohrenz, J., et al., "Calculating Viscosity of Reservoir Fluids from their Composition," Journal of Petroleum Technology, Oct. 1964, pp. 1171-1176.
Pedersen, et al. in "Viscosity of Crude Oils," Chemical Engineering Science, 1984, pp. 1011-1016, vol. 39, No. 6, Pergamon Press Ltd.
NG, H.J., al., "The Measurement and Prediction of Hydrate Formation in Liquid Hydrocarbon-Water Systems," Ind. Eng. Chem. Fund., 1976, pp. 293-298, vol. 15, No. 4.
NG, H.J., et al., "Hydrate Formation in Systems Containing Methane, Ethane, Propane, Carbon Dioxide or Hydrogen Sulfide in the Presence of Methanol," Fluid Phase Equil., 1985, pp. 145-155, vol. 21, Elsevier Science Publishers B. V., Amsterdam, Netherlands.
NG, H.J., et al., "New Developments in the Measurement and Prediction of Hydrate Formation for Processing Needs," International Conference on Natural Gas Hydrates, Annals of the New York Academy of Sciences, 1994, pp. 450-462, vol. 715.
Zuo, J.Y., et. al. "Representation of Hydrate Phase Equilibria in Aqueous Solutions of Methanol and Electrolytes Using an Equation of State," Energy and Fuels, 2000, pp. 9-24, vol. 14, American Chemical Society.
Zuo, J.Y., et. al., "A Thermodynamic Model for Gas Hydrates in the Presence of Salts and Methanol," Chem. Eng Comm., 2001, pp. 175-192, vol. 184, Overseas Publishers Association N.V.
Zuo, J.Y., et al., "An improved thermodynamic model for wax precipitation from petroleum fluids," Chemical Engineering Science, 2001, pp. 6941-6947, vol. 56, Pergamon.
Zuo, J.Y., et al., "Wax Formation from Synthetic Oil Systems and Reservoir Fluids," Energy and Fuels, 2008, pp. 2390-2395, vol. 22, American Chemical Society.
Du, J. et al., "A Thermodynamic Mode for the Predictions of Asphaltene Precipitation," Petroleum Science and Technology, 2004, pp. 1023-1033, vol. 22, No. 7 & 8.
Office Action for the equivalent Brazilian patent application BR112013023014-2 dated Oct. 1, 2019.

* cited by examiner

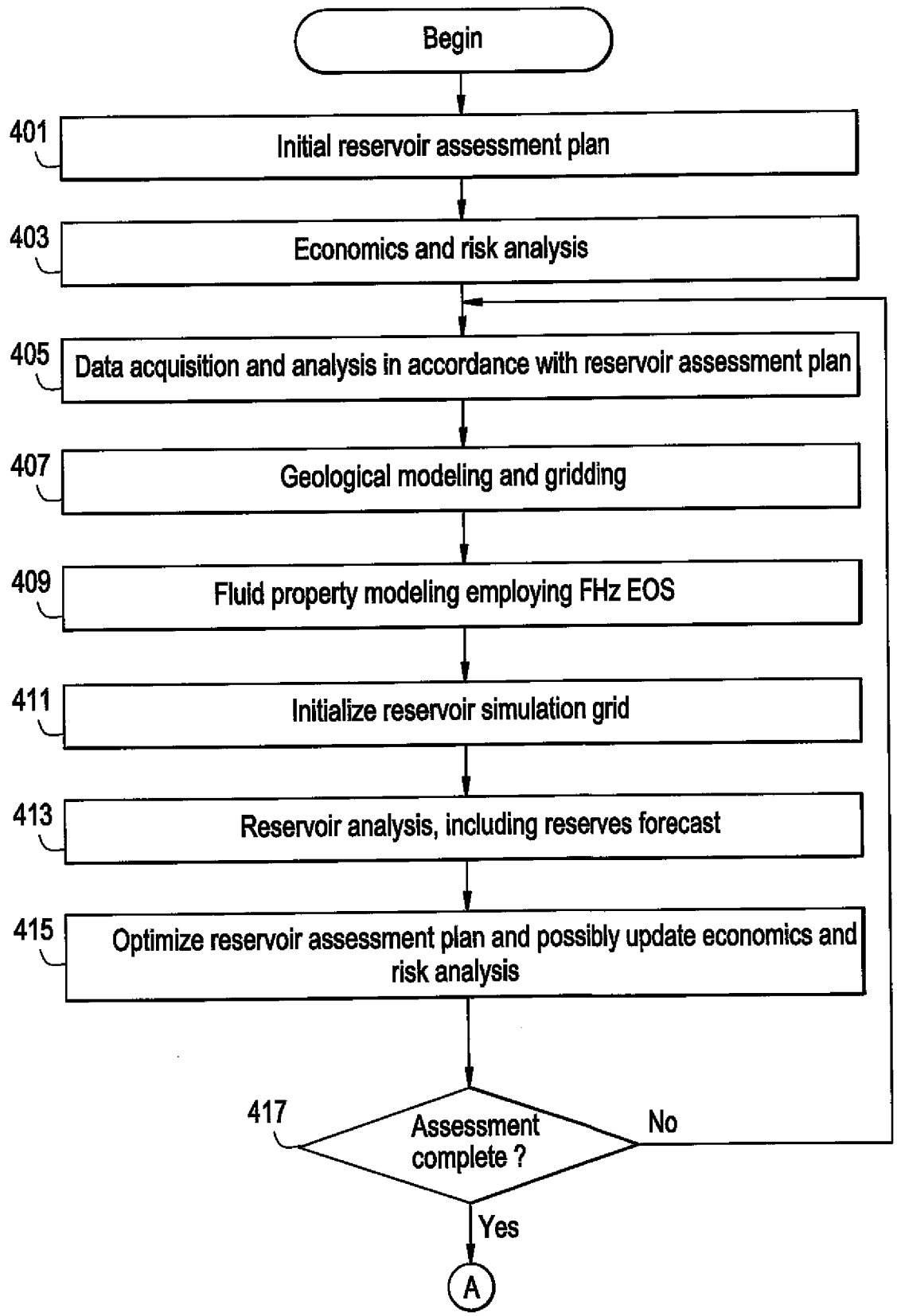

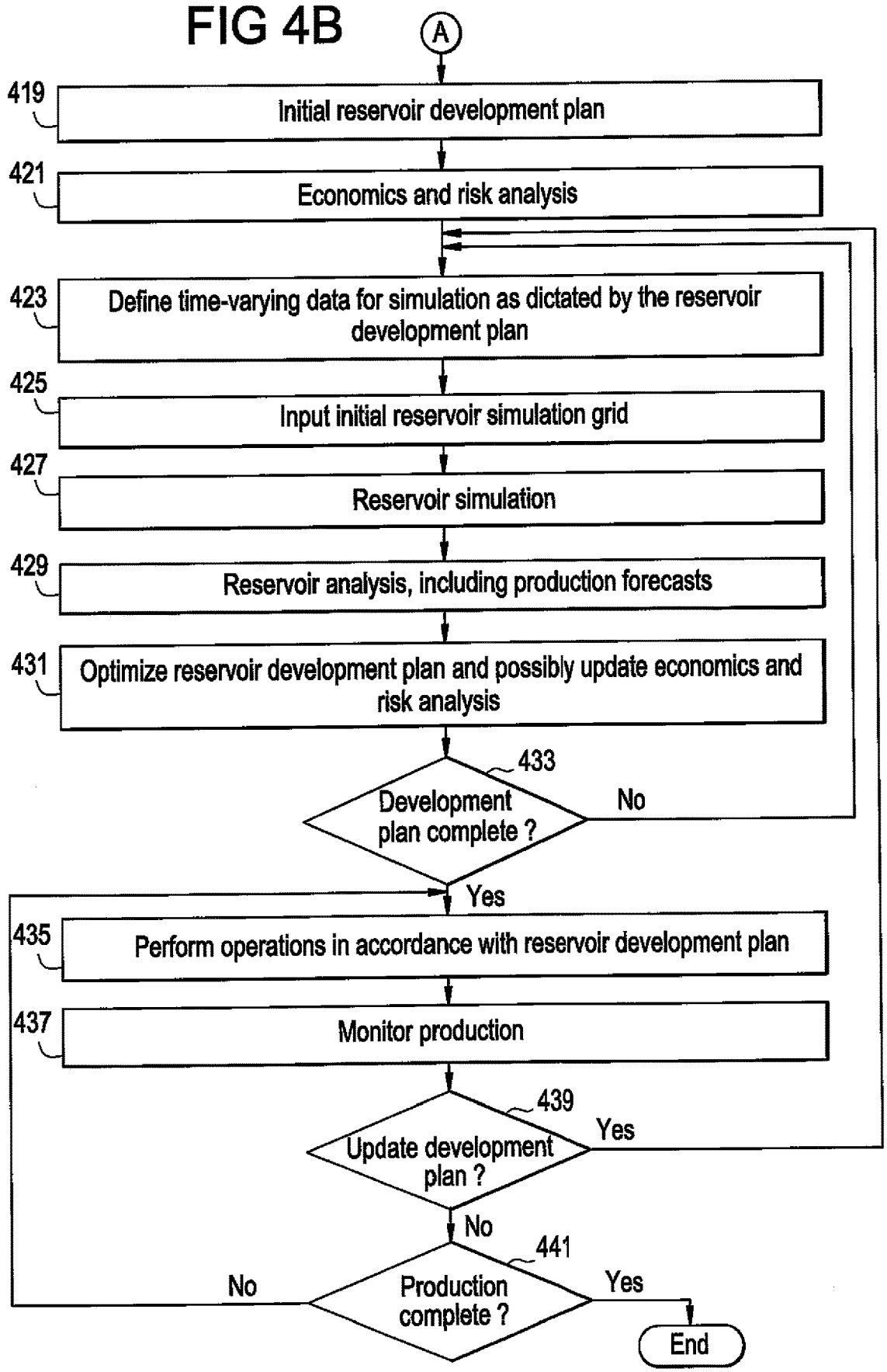

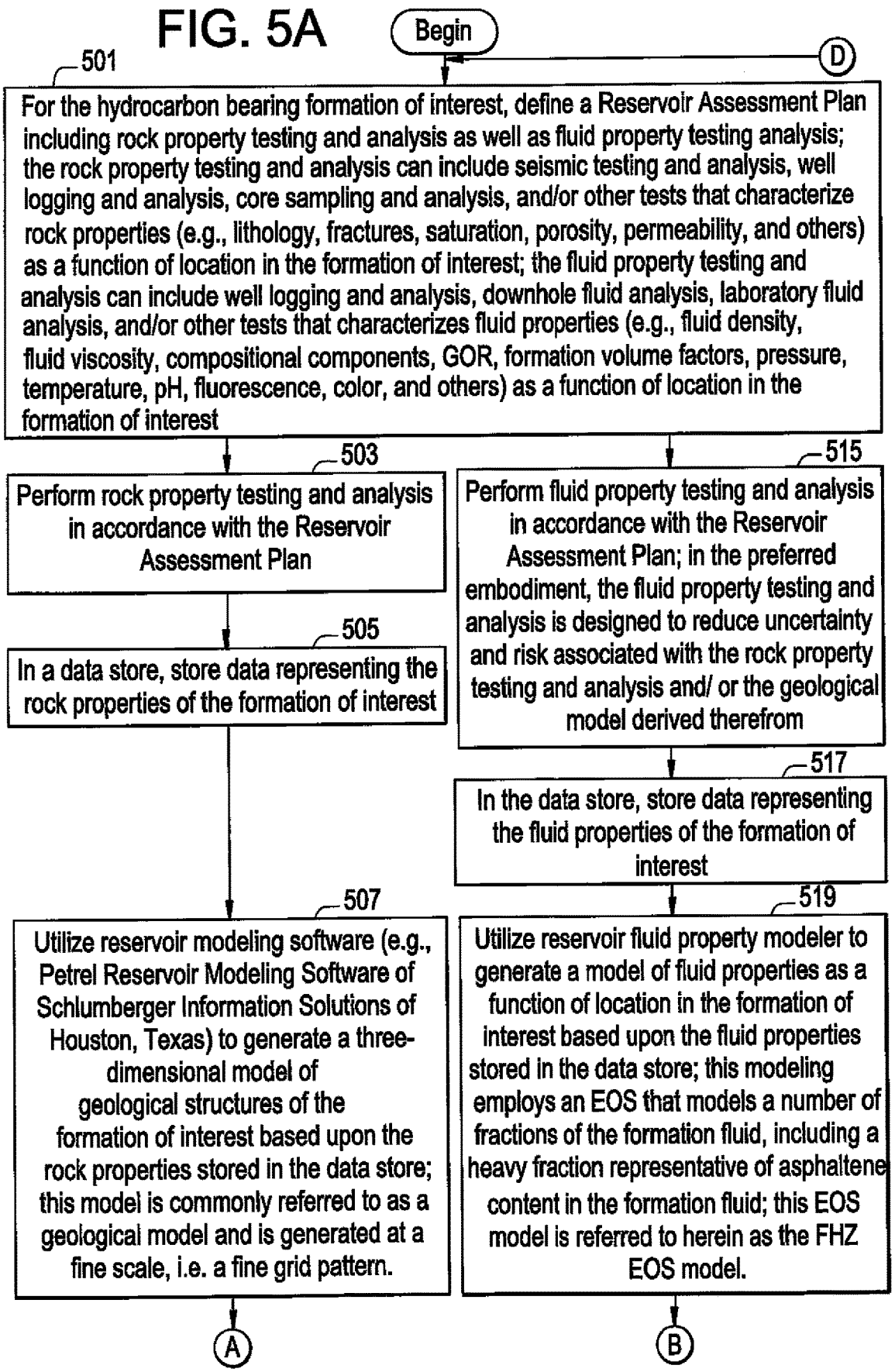

METHOD AND SYSTEMS FOR RESERVOIR MODELING, EVALUATION AND SIMULATION

BACKGROUND OF THE INVENTION

Field of the Invention

This invention relates to methods and apparatus for modeling, evaluating and simulating hydrocarbon bearing subterranean formations (which are commonly referred to as reservoirs).

State of the Art

Petroleum consists of a complex mixture of hydrocarbons of various molecular weights, plus other organic compounds. The exact molecular composition of petroleum varies widely from formation to formation. The proportion of hydrocarbons in the mixture is highly variable and ranges from as much as 97% by weight in the lighter oils to as little as 50% in the heavier oils and bitumens. The hydrocarbons in petroleum are mostly alkanes (linear or branched), cycloalkanes, aromatic hydrocarbons, or more complicated chemicals like asphaltenes. The other organic compounds in petroleum typically contain carbon dioxide (CO2), nitrogen, oxygen and sulfur, and trace amounts of metals such as iron, nickel, copper and vanadium.

Petroleum is usually characterized by SARA fractionation where asphaltenes are removed by precipitation with a paraffinic solvent and the deasphalted oil separated into saturates, aromatics and resins by chromatographic separation.

The saturates include alkanes and cycloalkanes. The alkanes, also known as paraffins, are saturated hydrocarbons with straight or branched chains which contain only carbon and hydrogen and have the general formula $C_nH_{2n+2}$. They generally have from 5 to 40 carbon atoms per molecule, although trace amounts of shorter or longer molecules may be present in the mixture. The alkanes include methane ($CH_4$), ethane ($C_2H_6$), propane ($C_3H_8$), i-butane ($iC_4H_{10}$), n-butane ($nC_4H_{10}$), i-pentane ($iC_5H_{12}$), n-pentane ($nC_5H_{12}$), hexane ($C_6H_{14}$), heptane ($C_7H_{16}$), octane ($C_8H_{18}$), nonane ($C_9H_{20}$), decane ($C_{10}H_{22}$), hendecane ($C_{11}H_{24}$)—also referred to as endecane or undecane, dodecane ($C_{12}H_{26}$), tridecane ($C_{13}H_{28}$), tetradecane ($C_{14}H_{30}$), pentadecane ($C_{15}H_{32}$) and hexadecane ($C_{16}H_{34}$). The cycloalkanes, also known as napthenes, are saturated hydrocarbons which have one or more carbon rings to which hydrogen atoms are attached according to the formula Cycloalkanes have similar properties to alkanes but have higher boiling points. The cycloalkanes include cyclopropane ($C_3H_6$), cyclobutane ($C_4H_8$), cyclopentane ($C_5H_{10}$), cyclohexane ($C_6H_{12}$), cycloheptane ($C_7H_{14}$), etc.

The aromatic hydrocarbons are unsaturated hydrocarbons which have one or more planar six-carbon rings called benzene rings, to which hydrogen atoms are attached with the formula $C_nH_n$. They tend to burn with a sooty flame, and many have a sweet aroma. Some are carcinogenic. The aromatic hydrocarbons include benzene ($C_6H_6$) and derivatives of benzene as well as polyaromatic hydrocarbons.

Resins are the most polar and aromatic species present in the deasphalted oil and, it has been suggested, contribute to the enhanced solubility of asphaltenes in crude oil by solvating the polar and aromatic portions of the asphaltenic molecules and aggregates.

Asphaltenes are insoluble in n-alkanes (such as n-pentane or n-heptane) and soluble in toluene. The C:H ratio is approximately 1:1.2, depending on the asphaltene source. Unlike most hydrocarbon constituents, asphaltenes typically contain a few percent of other atoms (called heteroatoms), such as sulfur, nitrogen, oxygen, vanadium and nickel. Heavy oils and tar sands contain much higher proportions of asphaltenes than do medium-API oils or light oils. Condensates are virtually devoid of asphaltenes. As far as asphaltene structure is concerned, experts agree that some of the carbon and hydrogen atoms are bound in ring-like, aromatic groups, which also contain the heteroatoms. Alkane chains and cyclic alkanes contain the rest of the carbon and hydrogen atoms and are linked to the ring groups. Within this framework, asphaltenes exhibit a range of molecular weight and composition. Asphaltenes have been shown to have a distribution of molecular weight in the range of 300 to 1400 g/mol with an average of about 750 g/mol. This is compatible with a molecule contained seven or eight fused aromatic rings, and the range accommodates molecules with four to tens rings. It is also known that asphaltene molecules aggregate to form nanoaggregates and clusters.

The life cycle of a reservoir typically follows certain stages including, but not limited to exploration, assessment, reservoir development, production, decline, and abandonment of the reservoir. Important decisions must be made at each of these stages in order to properly allocate resources and to assure that the reservoir meets its production potential. In the early stages of the life cycle, one begins with almost complete ignorance about the distribution of the internal properties within the reservoir. As development continues, diverse types of reservoir data are collected, such as seismic, well logs, and production data. Such reservoir data are combined to construct an understanding of the reservoir.

Computer-based software applications are commercially available for generating geological models which predict and describe the rock properties and features of subterranean formation. For example, geological models are built from data acquired during the exploration stage, such as seismic analysis, formation evaluation logs, and pressure measurements. Fluid models are built with the input from lab pressure-volume-temperature (PVT) analyses, geochemistry studies, pressure gradients, and downhole fluid analysis (DFA). Fluid models can be combined with geological models as part of a reservoir simulation grid (also commonly referred to as a reservoir model). The reservoir simulation grid represents the three-dimensional physical space of the formation by an array of discrete cells, delineated by a grid system which may be regular or irregular. Values for rock properties (e.g., porosity, permeability, water saturation) and fluid properties (e.g., compositions of liquid and gaseous phases, pressure, and temperature) are associated with each cell. Equations and associated computations are used to model and simulate the flow of fluids during production. Uncertainty in the values of the rock and fluid properties of the reservoir can be investigated by constructing several different realizations of the sets of property values. The phrase "reservoir characterization" is sometimes used to refer to reservoir modeling activities up to the point where the reservoir simulation grid characterizes the static rock and fluid properties of the reservoir, i.e., before the simulation of the dynamic flow of fluids during production.

Such computer-based reservoir modeling applications are used to achieve a better understanding of the reservoir and make critical decisions with respect to reservoir development. However, prior to the reservoir development stage, the uncertainty in these models is relatively high. Consequently, known reservoir modeling applications are not always available with sufficient accuracy to permit efficient reservoir development. This is a problem because relatively greater risk exists in the reservoir development stage in comparison with the exploration and assessments stages. Activity tends to occur at a faster pace in the reservoir development stage. For example, an operator typically decides which zones are to be completed immediately after logging and sampling operations. The zones are selected based on predicted commercial value as indicated by the volume of reserves represented in the existing models. If a mistake is made because of model inaccuracy, a costly workover operation and delayed production may result. The risks are particularly high in the case of offshore development because of higher development and operating costs.

One particular impediment to efficient reservoir development is reservoir compartmentalization. Reservoir compartmentalization is the natural occurrence of hydraulically isolated pockets within a reservoir. In order to produce a reservoir in an efficient manner, it is necessary to know the structure of the rock and the level of compartmentalization. A reservoir compartment does not produce unless it is tapped by a well. In order to justify the drilling of a well, the reservoir compartment must be sufficiently large to sustain economic production. Furthermore, in order to achieve efficient recovery, it is generally desirable to know the locations of as many of the reservoir compartments as practical before extensive development has been done.

There are three industry standard procedures widely used to understand reservoir compartmentalization. First is the evaluation of petrophysical logs. Petrophysical logs may identify impermeable barriers, and the existence of such barriers can be taken to mean that the reservoir is compartmentalized. Examples include gamma ray and NMR logs, both of which can identify impermeable barriers in favorable situations. Another example is the evaluation of mud filtrate invasion monitored by resistivity logs. However, impermeable barriers may be so thin that they are not observable by these logs, or barriers observed by these logs may not extend away from the wellbore and therefore may not compartmentalize the reservoir. Second is the evaluation of pressure gradients. If two permeable zones are not in pressure communication, they are not in flow communication. However, the presumption that pressure communication implies flow communication has repeatedly been proven to be incorrect. Pressure equilibration requires relatively little fluid flow and can occur more than 5 orders of magnitude faster than fluid compositional equilibration, even in the presence of flow barriers. Continuous pressure gradients are a necessary but insufficient test for reservoir connectivity. Third is the comparison of geochemical fingerprints of fluid samples acquired from different locations in the reservoir. Petroleum is a complex chemical mixture, containing many different chemical compounds; the composition of that petroleum can therefore be treated as a fingerprint. If the composition of petroleum samples from two different places in the reservoir is the same, it is assumed that fluids can flow readily between those two places in the reservoir and hence that the reservoir is connected. However, forces such as biodegradation and water washing can occur to different extents in different parts of the reservoir, causing two places in the reservoir to have different fingerprints even if they are connected. Additionally, petroleum samples generated from the same source rock may have very similar fingerprints even if they come from locations in the reservoir that are presently disconnected.

An alternative method to assess connectivity is to evaluate hydrocarbon fluid compositional grading. The chemical composition of petroleum must be different in different parts of a connected reservoir. This change in composition with position (typically depth) in the reservoir is referred to as compositional grading. The magnitude of this compositional grading (i.e., the difference in the composition of two fluids collected from different depths), in connected reservoirs at thermodynamic equilibrium, can be modeled with mathematical equations of state (EOS) and measured with downhole fluid analysis. If the magnitude of compositional grading is measured, and the measurement matches the predictions of the model, then the assumptions of the model are believed to be correct. In this case, the assumptions are that the reservoir is connected and at thermodynamic equilibrium. In the event that the magnitude of the compositional grading does not match the predictions of the EOS model, it can be assumed that there is reservoir compartmentalization or that the reservoir fluids are not in equilibrium. Many different forces can contribute to a lack of thermodynamic equilibrium, such as tar mats, water washing, biodegradation, real-time charging, etc. It can be difficult to determine whether the reservoir is compartmentalized or not in thermodynamic equilibrium, and this determination can be critical to important development decisions. More specifically, the traditional EOS (such as the Peng-Robinson EOS developed in 1976) utilized for compositional grading analysis are derived by adding correction terms to the ideal gas law to address gas-liquid equilibria. Thus, these standard EOS allow for compositional analysis of only gas and liquid phase fractions of the reservoir fluid, and such limited information makes it difficult to determine whether the reservoir is compartmentalized or not in thermodynamic equilibrium.

Thus, there is a clear need for methodologies that provide for an effective understanding of reservoir compartmentalization as early as possible (e.g., before development) in the lifecycle of the reservoir.

SUMMARY

In accord with one embodiment of the invention, a method and system for reservoir modeling, evaluation and simulation is provided that allows for effective understanding of reservoir compartmentalization early in the lifecycle of the reservoir (e.g., before development).

In accord with another embodiment of the invention, fluid property modeling that employs an EOS that characterizes an asphaltene concentration gradient is incorporated into a reservoir modeling and simulation framework to allow for reservoir compartmentalization (the presence or absence of flow barriers in the reservoir) to be assessed more quickly and easily. Additionally, automated integration of the fluid property modeling into the reservoir modeling and simulation framework allows the compositional gradients produced by the fluid property modeling (particularly the asphaltene concentration gradient) to be combined with other data, such as geologic data and other petrophysical data, which allows for more accurate assessment of reservoir compartmentalization.

In accord with another embodiment of the invention, the fluid property modeling is derived from downhole fluid analysis measurements within a wellbore that traverses the formation. The fluid property modeling may characterize asphaltene concentration as a function of location in the formation from downhole fluid color measurements (such as from an empirical relation of the form $OD_{DFA}=C1*W_a+C2$, where $OD_{DFA}$ is the measured color (i.e., optical density) of formation fluid at a particular wavelength, $W_a$ is the corresponding mass fraction of asphaltenes, and C1 and C2 are constants.

In accord with yet another embodiment of the invention, the reservoir modeling and simulation framework derives a reservoir simulation model from the results of such fluid property modeling and provides for visualization of properties of a reservoir simulation model to evaluate reservoir compartmentalization. The framework may provide for visualizing the properties of the reservoir simulation model together with asphaltene concentration derived from downhole fluid measurements within a wellbore traversing the formation and possibly structural faults defined by the reservoir simulation model in order to evaluate reservoir compartmentalization.

In accord with still another embodiment of the invention, the EOS of the fluid property modeling of the framework derives property gradients, pressure gradients and temperature gradients as a function of depth in the formation. Such property gradients may include mass fractions, mole fractions, molecular weights, and specific gravities for a set of pseudocomponents of the formation fluid. The set of pseudocomponents may include a heavy pseudocomponent representing asphaltenes in the formation fluid, a second distillate pseudocomponent that represents the non-asphaltene liquid fraction of the formation fluid, and a third light pseudocomponent that represents gases in the formation fluid. The set of pseudocomponents can also represent single carbon number (SCN) components as well as other fractions of the formation fluid. The EOS may predict compositional gradients with depth that take into account the impacts of at least one factor selected from the group consisting of gravitational forces, chemical forces, and thermal diffusion. The output of the EOS can be used to generate a profile of asphaltene pseudocomponents (e.g., nanoaggregates and larger asphaltene clusters) and corresponding aggregate size of asphaltenes as a function of location in the formation. The output of the EOS can also be used to predict gradients for at least one particular fluid property (e.g., fluid density and fluid viscosity) that relates to asphaltene content.

Additional objects and advantages of the invention will become apparent to those skilled in the art upon reference to the detailed description taken in conjunction with the provided figures.

BRIEF DESCRIPTION OF THE DRAWINGS

FIGS. 4A-4B include flow charts of an exemplary workflow for reservoir assessment and reservoir development in accordance with a first embodiment of the present invention; the workflow of FIGS. 4A-4B employs modeling of geological and fluid properties of a formation of interest together with reservoir simulation based thereon for optimizing reservoir assessment and/or reservoir development.

FIGS. 5A-5C include flow charts of an exemplary workflow for reservoir assessment and reservoir development in accordance with a second embodiment of the present invention; the workflow of FIGS. 5A-5C employs modeling of geological and fluid properties of a formation of interest together with reservoir simulation based thereon for optimizing reservoir assessment and/or reservoir development.

DETAILED DESCRIPTION

Operations, such as surveying, drilling, wireline testing, planning and analysis, are typically performed to locate and sample hydrocarbons located in a subterranean formation over the lifecycle of the formation. Various aspects of such operations are shown in FIG. 1.

Seismic surveys are often performed using seismic acquisition methodologies which employ a plurality of sensors (such as seismic scanner 302a as shown) that monitor the reflection and attention of sound vibrations directed into the earth formation. The sensors typically include a geophone-receiver that produces electrical output signals characteristic of the reflected sound vibrations. The electrical output signals are processed and converted into digital form (typically referred to as seismic data) for storage, transmission or further processing as desired, for example by data reduction.

Such seismic data may be processed and interpreted to characterize changes in anisotropic and/or elastic properties, such as velocity and density, of the geological formation at various depths. This information may be used to generate basic structural maps of the subterranean formation. Such structural maps can be analyzed to assess the underground formations and determine the likelihood that hydrocarbons are located therein and are readily accessible. Inversion techniques can be applied to the seismic data to reflect reliable rock and fluid properties of the formation. The inversion techniques may be pre- or post-stack, deterministic, stochastic or geostatistical, and typically includes other reservoir measurements such as well logs and cores.

Figure 1:
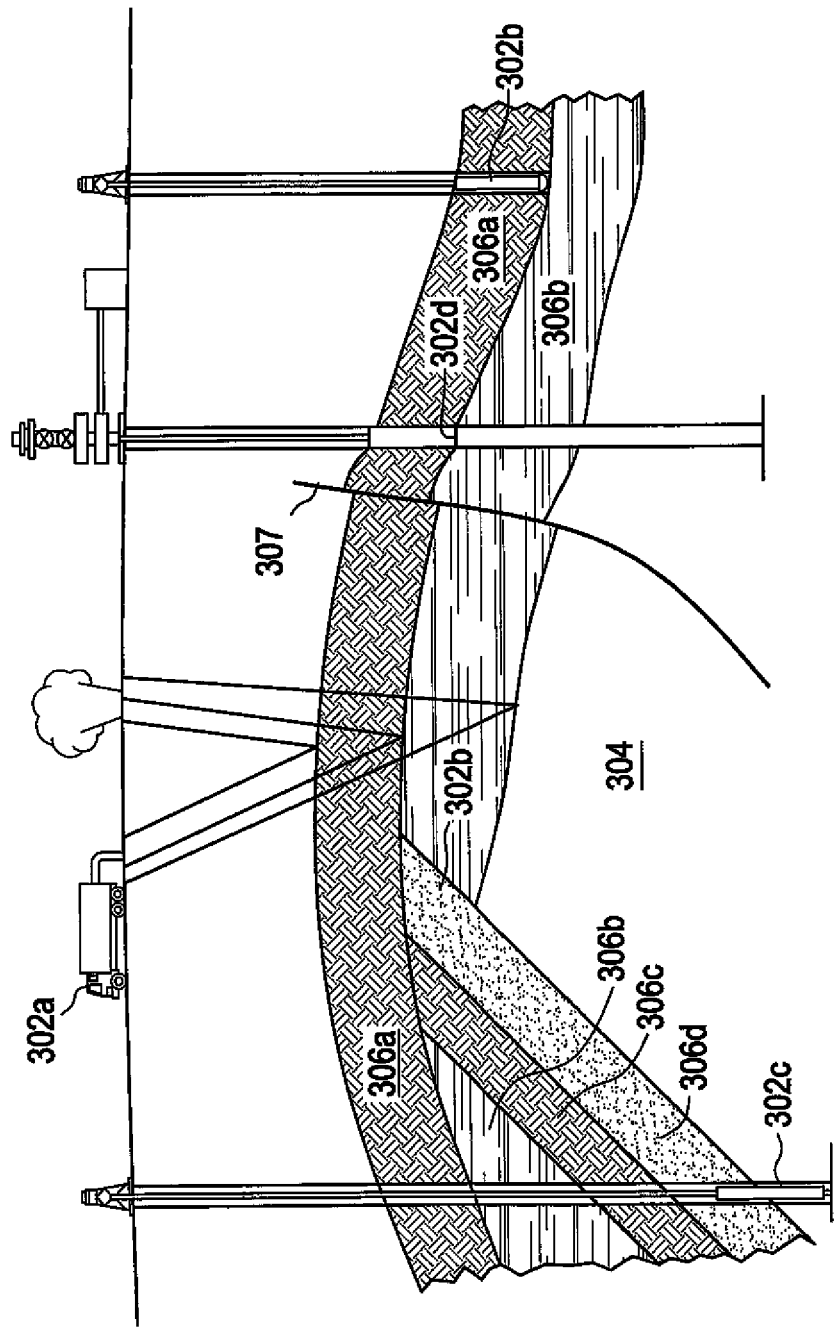
FIG. 1 is a schematic view of an exemplary subterranean formation of interest having a plurality of data acquisition tools disposed at various locations in the formation of interest for collecting data used in modeling and simulating properties of the formation of interest.

The exemplary subterranean structure 304 of FIG. 1 may include several formations or layers, including, but not limited to: a shale layer (306a), a carbonate layer (306b), a shale layer (306c) and a sand layer (306d). A fault (307) extends through the layers 306a and 306b. Petroleum fluid is contained within the carbonate layer 306b. The seismic surveying tools may be adapted to derive a structural map of the reservoir as well as rock and fluid properties of the formation. While a specific subterranean formation with specific geological structures is depicted, it will be appreciated that the structure may contain a variety of geological formations, sometimes having extreme complexity. In some locations, typically below the water line, fluid may occupy pore spaces of the formations.

One or more wells may extend into the subterranean formation. The wells can be provided with tools that are used to drill the well and/or analyze the subterranean formation and/or hydrocarbon fluids located therein for evaluation purposes. For example, a drilling tool 302b can be deployed from a drilling rig and advanced into the earth along a desired path as shown in FIG. 1. Fluid, such as drilling mud or other drilling fluids, may be pumped down the wellbore through the drilling tool and out the drilling bit. The drilling fluid flows through the annulus between the drilling tool and the wellbore and out the surface, carrying away earth loosened during drilling. The drilling fluids return the earth to the surface and seal the wall of the wellbore to prevent fluid in the surrounding earth from entering the wellbore and causing a blow out. During the drilling operation, the drilling tool may perform downhole measurements to investigate downhole conditions. The drilling tool may also be used to take core samples of the formation.

In some cases, the drilling tool can be removed and a wireline tool 302c can be deployed into the wellbore to perform core sampling or additional downhole testing (such as analysis of the properties of the formation, sampling of formation fluids, analysis of the properties of the formation fluids). The wireline tool 302c may be positioned at various depths in the wellbore to provide a survey or other information relating to the subterranean formation. The wireline tool 302c (and/or the drilling tool 302b) can perform a variety of operations, including, but not limited to: well logging operations, downhole fluid sampling, core sampling, and downhole fluid analysis.

Well logging operations measure rock and fluid properties of the formation (such as lithology, porosity, permeability, oil and water saturation, etc). Lithology represents the rock type and is typically measured by well logging operations such as natural gamma, neutron, density, photoelectric, resistivity and/or combinations thereof. Porosity represents the amount of pore space in the rock and is typically measured by neutron or gamma ray logging or NMR measurements. Permeability represents the quantity of fluid (usually hydrocarbon) that can flow from the rock as a function of time and pressure. Formation testing is so far the only direct downhole permeability measurement. In case of its absence, which is common in most cases, permeability estimation may be derived from other measurements, such as porosity, NMR, sonic, by empirical correlations. Water saturation represents the fraction of the pore space occupied by water and is typically measured using an instrument that measures the resistivity of the rock. Oil saturation represents the fraction of the pore space occupied by oil and is typically measured by neutron logging or dielectric scanning.

Downhole fluid sampling extract and store one or more live fluid samples within the tool.

Core sampling operations extract one or more core samples from the formation. Each core sample is isolated and identified from other core samples. There are several types of core samples that can be recovered from the wellbore, including but not limited to: full-diameter cores, oriented cores, native state cores and sidewall cores. In an exemplary embodiment, the coring tool obtains one or more sidewall cores from the formation adjacent the wellbore. Core samples can also be acquired while the well is being drilled. Coring operations can be run in combination with other suitable logging operations (such as gamma ray logging) to correlate with openhole logs for accurate, real-time depth control of the coring points.

Downhole fluid analysis operations extract live fluid from the formation adjacent the wellbore and derive properties (e.g., GOR, oil-based-mud contamination, saturation pressure, live fluid density, live fluid viscosity, and compositional component concentrations, etc.) that characterize the live fluid at the pressure and temperature of the formation. For example, the Quicksilver probe and InSitu fluid analyzer commercially available from Schlumberger can be used to perform such downhole fluid analysis operations.

Laboratory analysis can be performed on the core samples and/or live fluid samples gathered from the reservoir. The live fluid samples may be reconditioned to the formation reservoir and pressure at the sample depth and subjected to analytical measurements (e.g., GOR, oil-based-mud contamination, fluid composition) that replicate the downhole fluid analysis measurements. The results of the laboratory measurements can be compared to the results of the corresponding downhole measurements for chain of custody verification. In the case of verification failure, actions can be taken to identify and correct the cause of the failure, which can arise from hardware failure of the downhole fluid analysis tool or laboratory tool, and inappropriate sampling, sample reconditioning and/or sample transfer techniques. The core sample can be analyzed in the laboratory by many different means. For example, such analysis can include bulk measurements (e.g., porosity, grain density, permeability, residual saturation, etc.) to measure properties of the core sample. In the case that the core sample includes movable hydrocarbons, hydrocarbon fluid can be extracted from the core sample by centrifuging the core sample. In the case that the core sample is non-movable bitumen, hydrocarbon fluid can be extracted from the bitumen core sample using a solvent. In either case, the composition of the extracted hydrocarbon fluid can be analyzed by geochemical analysis, which can be carried out by a variety of techniques including, but not limited to:

Gas chromatography, including, but not limited to: gas chromatography with various detection schemes (e.g., flame ionization detector, thermal conductivity detector, mass spectrometer);

Saturates-aromatics-resins-asphaltenes (SARA) analysis;

Optical spectroscopy in the ultraviolet, visible, and near-infrared regions;

Infrared spectroscopy (including, but not limited to, instruments using Fourier transform);

Fluorescence spectroscopy;

Raman spectroscopy;

Liquid chromatography, including, but not limited to, various modifications (high pressure/performance, reverse phase, with mass spectrometric detection, etc);

Pyrolysis experiments with gas chromatography or other detection methods;

Isotope analysis (for example performed using an isotope ratio mass spectrometer); and Nuclear magnetic resonance (NMR) spectroscopy using various nuclei (13C, 1H, etc.).

Drilling may continue until the desired total depth is reached. Steel casing may be run into the well to a desired depth and cemented into place along the wellbore wall. A surface unit (not shown) may be used to communicate with the drilling tool 302b and/or wireline tool 302c and possibly to offsite operations. The surface unit may be capable of communicating with the drilling tool 302b and/or wireline tool 302e to send commands to the respective tool, and to receive data therefrom. The surface unit may be provided with computer facilities for receiving, storing, processing, and/or analyzing data from the reservoir. The surface unit collects data generated during the drilling or logging operation and produces data output which may be stored or transmitted. Computer facilities, such as those of the surface unit, may be positioned at various locations about the reservoir and/or at remote locations.

After the drilling operation is complete, the well may then be prepared for production. Completions equipment may be deployed into the wellbore to complete the well in preparation for the production of hydrocarbons therethrough. Such completions equipment can include a production tool 302d (such as a packer, artificial lift apparatus, sand control device, etc.) as shown in FIG. 1. Hydrocarbons are allowed to flow from the downhole reservoir through the completions equipment to the surface. Production facilities positioned at surface locations may collect the hydrocarbons from the wellsite(s). Fluid drawn from the subterranean reservoir(s) passes to the production facilities via transport mechanisms, such as tubing. Various equipments may be positioned about the reservoir to monitor oilfield parameters, to manipulate the operations and/or to separate and direct fluids from the wells. Surface equipment and completion equipment may also be used to inject fluids into reservoirs, either for storage or at strategic points to enhance production of the reservoir. As fluid passes to the surface, various dynamic measurements, such as fluid flow rates, pressure and composition may be monitored. These parameters may be used to determine various characteristics of the subterranean formation.

While only simplified wellsite configurations are shown, it will be appreciated that the reservoir may cover a portion of land, sea and/or water locations that hosts one or more wellsites. Production may also include injection wells (not shown) for added recovery. One or more gathering facilities may be operatively connected to one or more of the wellsites for selectively collecting downhole fluids from the wellsite(s).

The information generated by the operations depicted in FIG. 1 and summarized above may be used to evaluate the reservoir, and make decisions concerning development and production. Such decisions may involve well planning, well targeting, well completions, operating levels, production rates and other operations and/or operating parameters.

Seismic data may be used by a geophysicist to determine characteristics of the subterranean formations and features. Well-logging data as well as the data resulting from core analysis, laboratory fluid analysis and downhole fluid may characterize the porosity and permeability of the rock of the formation as well as viscosity, density and compositions of the fluids contained therein. Such information may be used by a geologist to determine various characteristics of the subterranean formation. Production data, if available, may be used by a reservoir engineer to determine fluid flow reservoir characteristics.

The information analyzed by the geophysicist, geologist and/or the reservoir engineer may be used in conjunction with one or more computer-based reservoir modeling applications that model the behavior of the geological formations, downhole reservoirs, wellbores, surface facilities as well as other portions of the operations. Examples of these reservoir modeling applications are shown in U.S. Pat. No. 5,992,519; WO2004/049216; WO1999/064896; U.S. Pat. No. 6,313,837; US2003/0216897; U.S. Pat. No. 7,248,259; US2005/0149307; US2006/0197759; U.S. Pat. No. 6,980,940; WO2004/049216; US2004/0220846; and U.S. Pat. No. 6,801,197; all herein incorporated by reference in their entireties.

In another example, the information generated by the operations depicted in FIG. 1 can be used for decisions that optimize production of the reservoir, such as decisions with respect to drilling new wells, re-completing existing wells or alter wellbore production. Oilfield conditions, such as geological, geophysical and reservoir engineering characteristics may have an impact on operations, such as risk analysis, economic valuation, and mechanical considerations for the production of subsurface reservoirs. Data from one or more wellbores may be analyzed to plan or predict various outcomes at a given wellbore. In some cases, the data from neighboring wellbores, or wellbores with similar conditions or equipment, may be used to predict how a well will perform. There are usually a large number of variables and large quantities of data to consider in analyzing operations involving the reservoir. It is, therefore, often useful to model the behavior of the reservoir to determine a desired course of action. During the ongoing operations, the operating parameters may need adjustment as oilfield conditions change and new information is received.

Embodiments of the present disclosure may include the operations described above with respect to FIG. 1 as part of a workflow (FIGS. 4A-4B) that effectively models a reservoir for evaluating and understanding reservoir compartmentalization, particularly during early stages of the lifecycle of the reservoir (such as the exploration and reservoir assessment stages). The workflow may employ a reservoir modeling software framework 100 as illustrated in FIG. 2.

Figure 2:
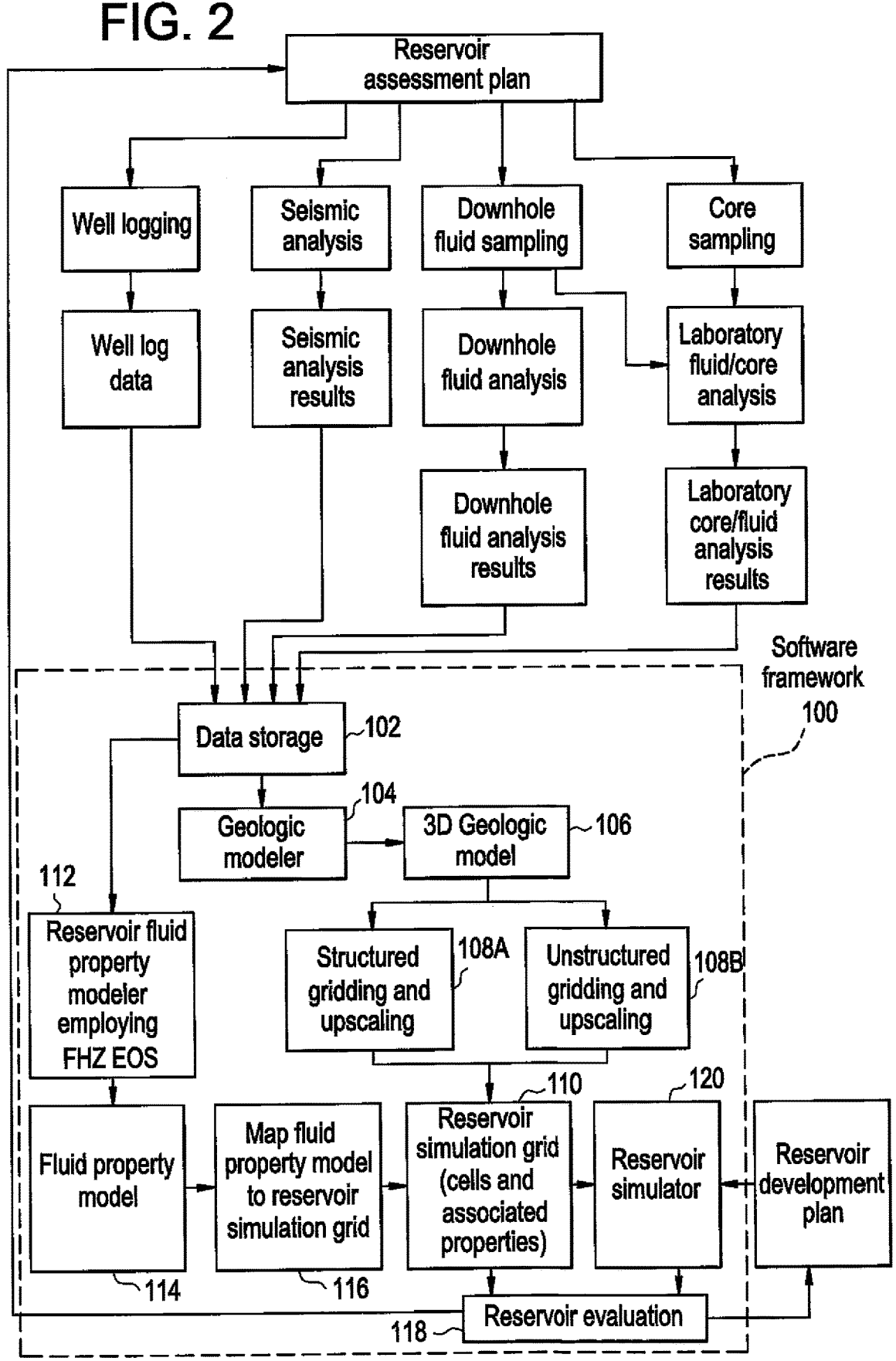
FIG. 2 is a functional block diagram of an exemplary reservoir modeling software framework for modeling and simulating properties of a formation of interest in accordance with the present invention.

The software framework 100 may include a data store 102 that stores the data generated from the data gathering operations of FIG. 1 as illustrated schematically in FIG. 2. Such data can include well log data (i.e. petrophysical data), seismic analysis results, laboratory core and fluid analysis results, and downhole fluid analysis results that pertain to a specific formation of interest as well as historical data for other formations that are related to the formation of interest in some meaningful way. The particular data gathering operations may be dictated by a reservoir assessment plan as depicted schematically in FIG. 2. The goal of the reservoir assessment plan may be to derive an understanding of the structure and stratigraphy of the formation of interest as well as a forecast of the hydrocarbons that are contained in the formation of interest. Risk and uncertainty can be accounted for in particular tests and analyses that are part of the reservoir assessment plan, the reservoir modeling that is accomplished by the software framework 100, and the summary information and decisions that are based thereon.

A geologic modeler 104 operates on the data stored in the data store 102 to generate a three-dimensional geological model 106 of the formation of interest. The three-dimensional geological model 106 is a framework that provides a description of the structure and stratigraphy of the formation of interest. In an exemplary embodiment, the geological model 106 provides a basic description of the formation of interest in terms of dimensions and unconformities (e.g., fractures, layers and permeability barriers). The geological model may include the following information for the formation of interest:

Top reservoir surface, which can be a constant value or a complex surface interpolated from well markers and/or geophysics;

Base reservoir surface, which can be derived as an offset (constant or variable) from the top reservoir surface or a complex surface interpolated from well markers and/or geophysics;

Intra-reservoir surface, as needed and similar to the top and base reservoir surfaces;

Reservoir boundaries, which can be derived from bounding faults, pinchouts, designated extent, etc.

Rock and fluid properties such as facies (which can be derived from geostatistical modeling or object modeling) as well as porosity, permeability, relative permeabilities, water saturation, net-to-gross ratio, capillary pressure (which can be derived from inversion of seismic data, core analyses and well logs and/or historical data)

The geological model 106 may be constructed of a large number of grid cells, with each grid cell typically populated with a reservoir property that includes, but is not limited to, rock type, porosity, permeability, initial interstitial fluid saturation, and relative permeability and capillary pressure functions. The geographical model can be derived from an intermediate model, such as a stratigraphic model, as is well known in the art. The grid cells can be structured or unstructured. Structured grid cells have similar shape and the same number of sides or faces. Common structured grid cells may be defined in Cartesian or radial coordinate systems in which each cell has four sides in two dimensions or six faces in three dimensions. Unstructured grid cells may be made up of polygons (polyhedra in three dimensions) having shapes, sizes, and number of sides or faces that can vary from place to place. One type of unstructured grid cell includes the Voronoi grid cell. Each Voronoi grid cell may be associated with a node and a series of neighboring cells. The Voronoi grid may be locally orthogonal in a geometrical sense; that is, the cell boundaries may be normal to lines joining the nodes on the two sides of each boundary. For this reason, Voronoi grid cells may also commonly be called perpendicular bisection (PEBI) grid cells. Other types of unstructured grid cells can also be used.

Reservoir simulations may be performed with a coarser grid system as the direct use of fine-grid models for reservoir simulation is not generally feasible because their fine level of detail places prohibitive demands on computational resources. Therefore, the software framework 100 employs one or more gridding and upscaling modules (two shown as 108A and 108B) that scale up the fine-grid geologic model 106 to a coarser reservoir simulation grid 110 while preserving, as much as possible, the fluid flow characteristics of the fine-grid geological model 106. The module 108A upscales a structured fine-grid geographical model 106 to the coarser reservoir simulation grid 110. Examples of suitable upscaling procedures for use in module 108A are provided in the following papers: Wen et al., "Upscaling Hydraulic Conductivities in Heterogeneous Media: An Overview," Journal of Hydrology, Vol. 183 (1996) 9-32; Begg et al., "Assigning Effective Values to Simulator Gridblock Parameters for Heterogeneous Reservoirs," SPE Reservoir Engineering (November 1989) 455-465; Durlofsky et al., "Scale Up of Heterogeneous Three Dimensional Reservoir Descriptions," Paper SPE 30709 presented at the Annual Technical Conference and Exhibition, Dallas, Tex. (Oct. 22-25, 1995); and Li et al., "Global Scale-up of Reservoir Model Permeability with Local Grid Refinement", Journal of Petroleum Science and Engineering, Vol. 14 (1995) 1-13. U.S. Pat. No. 6,196,561 to Farmer, commonly assigned to assignee of the present application and herein incorporated by reference in its entirety, describes a structured gridding and upscaling methodology that can be carried out by module 108A. The module 108B upscales an unstructured fine-grid geographical model 106 to the coarser reservoir simulation grid 110. Examples of suitable upscaling procedures for use in module 108B are provided by M. Prevost et al., "Unstructured 3D Gridding and Upscaling for Coarse Modeling of Geometrically Complex Reservoirs," Petroleum Geoscience, October 2005, v. 11; no. 4, pgs. 339-345 as well as U.S. Pat. No. 6,826,520 to Khan et al. and U.S. Pat. No. 6,018,497 to Gunasekera, herein incorporated by reference in their entireties. The resultant reservoir simulation grid 110 may be constructed from a coarse grid of cells that are associated with petrophysical properties such as porosity, permeability, initial interstitial fluid saturation, and relative permeability and capillary pressure functions. For a fractured reservoir, a dual-porosity model and/or a dual-permeability model can be used. Local grid refinements (a finer grid embedded inside of a coarse grid) can also be used, for example to more accurately represent the near wellbore multi-phase flow affects.

The software framework 100 may further include a fluid property modeler 112 that operates on the data stored in the data store 102 to generate a fluid property model 114 that characterizes the fluid properties of the formation of interest. The fluid property modeler 112 may employ a particular equation of state model, referred to herein as the FHZ EOS, that derives property gradients, pressure gradients and temperature gradients as a function of depth in the formation of interest. These gradients may be incorporated as part of the fluid property model 114. The property gradients derived from the FHZ EOS may include mass fractions, mole fractions, molecular weights, and specific gravities for a set of pseudocomponents of the formation fluid. Such pseudocomponents may include a heavy pseudocomponent representing asphaltenes in the formation fluid, a second distillate pseudocomponent that represents the non-asphaltene liquid fraction of the formation fluid, and a third light pseudocomponent that presents gases in the formation fluid. The pseudocomponents derived from the FHZ EOS can also represent single carbon number (SCN) components as well as other fractions or lumps of the formation fluid (such as a water fraction) as desired. The FHZ EOS can predict compositional gradients with depth that take into account the impacts of gravitational forces, chemical forces, thermal diffusion, etc. as taught in U.S. Patent Appl. Nos. 61/225,014 and 61/306,642, herein incorporated by reference in its entirety. Other applications of the FHZ EOS have been described in U.S. Pat. No. 7,822,554 and U.S. patent application Ser. Nos. 12/209,050; 12/352,369; 12/990,980; 12/483,813; 61/282,244; 61/387,066; 12/752,967; and 61/332,595, herein incorporated by reference in their entireties. For some cases, one or more terms of the FHZ EOS dominate and the other terms can be ignored. For example, in low GOR black oils, the gravity term of the FHZ EOS dominates and the term related to chemical forces (solubility) and thermal diffusion (entropy) can be ignored.

The compositional gradients produced by the FHZ EOS can be used in conjunction with a Flory-Huggins solubility model to derive a concentration profile of asphaltene pseudocomponents (e.g., asphaltene nanoaggregates and larger asphaltene clusters) and corresponding aggregate size of asphaltenes as a function of depth in the formation of interest as taught in U.S. Patent Appl. Nos. 61/225,014; 61/306,642; and 61/332,595, herein incorporated by reference in their entireties. This information can also be incorporated into the fluid property model 114.

The asphaltene concentration gradient can also be used to predict gradients for fluid properties (such as fluid density and fluid viscosity) that relate to asphaltene content. For predicting viscosity, the predictions can be based on the empirical correlation of the form proposed by Lohrenz, Bray and Clark in "Calculating Viscosity of Reservoir Fluids from their Composition," JPT, October 1964, pp 1171-117, or the empirical correlation of the form proposed by Pedersen et al. in "Viscosity of Crude Oils," Chemical Engineering Science Vol 39, No 6, pp 1011-1016, 1984. These fluid property gradients can also be incorporated into the fluid property model 114.

In an exemplary embodiment, the FHZ EOS utilized by the fluid property modeler 112 may be tuned in accordance with laboratory fluid data or downhole fluid analysis data that is stored in the data store 102 and describes the fluids of the formation of interest. Corrections for drilling fluid contamination may be necessary. An example of such corrections is described in U.S. patent application Ser. No. 12/990,980.

The fluid property model 114 may be stored in the data store 102 and may include data that describes fluid properties as a function of location in the formation of interest. In an exemplary embodiment, the fluid property model 114 may include one or more of the following:

component mass fractions, molecular weights and critical properties (pressure, temperature, volume) as a function of location in the formation of interest;

component acentric factors, Z-factor, volume shift parameters, reference density;

binary interaction coefficients; and formation volume factors, fluid density, fluid viscosity, and asphaltene concentration and aggregate sizes as a function of location in the formation of interest.

In an exemplary embodiment, a fluid property model may include parameters that represent the continuous changes in respective fluid properties as a function of position along one or more wellbores that traverse a formation of interest.

The framework 100 may further include a module 116 that maps or interpolates the fluid properties of the formation fluids as represented by the fluid property model 114 to the grid cells of the reservoir simulation grid 110. In an exemplary embodiment, the fluid properties for a given simulation grid cell may be interpolated from the fluid properties of the fluid property model corresponding to the nearest formation locations. Such interpolation may be carried out separately over the grid cells for each compartment of the formation. For example, consider a trend such as asphaltene concentration increasing with depth within from an initial value and rate of change within a reservoir compartment. That trend may occur, with the magnitude predicted by the EOS, but the trend may stop abruptly at the end of the compartment. Such trend parameters can be used to interpolate the asphaltene concentration over the grid cells of this compartment. In the next compartment, the trend may start over with a different initial value and a different rate of change. These different trend parameters can be used to interpolate the asphaltene concentration over the grid cells of the next compartment. In performing the interpolation, continuous changes of a respective fluid property value may be mapped into discrete values, and the cells may then be populated with such discrete values. That is to say, the smooth variation of a respective fluid property values may be binned into something that looks like a stairstep variation.

The framework 100 may further include an evaluation module 118 that provides the user with the capability to review and analyze the information stored in the reservoir simulation grid 110 in order to understand the structural properties and fluid properties of the formation of interest. The evaluation module 118 can provide for rendering of 3-D representations of properties of the formation of interest for use in full-field visualization. The evaluation module 118 can also display 2-D representations of properties of the formation of interest, such as cross-sections and 2-D radial grid views. In an illustrative embodiment, the evaluation module 118 can be used to characterize the reservoir (i.e., evaluate the static state of the reservoir before any production) and identify, confirm or modify reserves forecasts for the formation of interest and/or any uncertainties and risk factor associated therewith. The information provided by the evaluation module 118 can be used to update the reservoir assessment plan in the event that uncertainties or risks are unacceptable or new information is gathered. Changes or additions to the tests and analyses of the assessment plan can be planned and carried out in order to acquire additional data, and the modeling and simulation operations of the modules of the framework 100 can be repeated in an attempt to seek a more certain understanding of the formation of interest.

When assessment is complete, a reservoir development plan can be defined. The reservoir development plan may store information for producing hydrocarbons from the formation of interest, such as the number and location of wells, the completion apparatus of wells, artificial lift mechanisms, enhanced recovery mechanisms (such as water flooding, steam injection for heavy oil, hydraulic fracturing for shale gas and the like), pipeline systems, facilities, and the expected production of fluids (gas, oil, water) from the formation. Details of the reservoir development plan may be input to a reservoir simulator module 120 of the framework 100. The reservoir simulator 120 may derive computational equations and associated time-varying data that represent the details of reservoir development plan over time. Examples of such computational equations and associated time-varying data is described in U.S. Patent Publ. No. 2010/0004914 to Lukyanoc et al., commonly assigned to assignee of the present application and herein incorporated by reference in its entirety. The reservoir simulator 120 may utilize the computational equations and associated time varying data representing the reservoir development plan together with the rock properties and fluid properties stored in the reservoir simulation grid 110 upon completion of reservoir characterization (or updated thereafter) to derive the pressure and fluid saturations (e.g., volume fractions) for each cell as well as the production of each phase (i.e., gas, oil, water) over a number of time steps.

In an exemplary embodiment, the reservoir simulator 120 carries out finite difference simulation, which is underpinned by three physical concepts: conservation of mass, isothermal fluid phase behavior, and the Darcy approximation of fluid flow through porous media. Thermal simulation (which may be used for heavy oil applications) adds conservation of energy to this list, allowing temperatures to change within the reservoir. The PVT properties of the oil and gas phases of the reservoir fluids of the grid may be fitted to an equation of state (EOS), as a mixture of components in order to dynamically track the movement of both phases and components in a formation of interest. Changes in saturation of three phases (gas, oil, and water) as well as pressure of each phase may be calculated in each cell at each time step. For example, declining pressure in a reservoir may result in gas being liberated from the oil. In another example, with increasing pressure in the reservoir (e.g., as a result of water or gas injection), gas may be re-dissolved into the oil phase. Details of exemplary operations for carrying out the finite difference simulation are set forth in U.S. Pat. No. 6,230,101 to Wallis, commonly assigned to assignee of the present application and herein incorporated by reference in its entirety. Alternatively, finite element simulation techniques and/or streamline simulation techniques can be used by the reservoir simulator 120. The EOS employed by the simulator 120 may be based on the FHZ EOS that is employed by the fluid property modeler 112 as described above. The FHZ EOS can be extended to derive and simulate a variety of properties of the reservoir fluid of the formation, including, but not limited to:

i) PVT properties (e.g., phase envelope, pressure-temperature (PT) flash, constant composition expansion (CCE), differential liberation (DL), constant volume depletion (CVD));

ii) gas hydrate formation;

iii) wax precipitation;

iv) asphaltene precipitation; and v) scaling.

Examples of equations for extending the FHZ EOS model for predicting gas hydrate formation are described in H. J. Ng et al., "The Measurement and Prediction of Hydrate Formation in Liquid Hydrocarbon-Water Systems," Ind. Eng. Chem. Fund., 15, 293 (1976); H. J. Ng et al., "Hydrate Formation in Systems Containing Methane, Ethane, Propane, Carbon Dioxide or Hydrogen Sulfide in the Presence of Methanol," Fluid Phase Equil., 21, 145 (1985); H. J. Ng et al., "New Developments in the Measurement and Prediction of Hydrate Formation for Processing Needs," International Conference on Natural Gas Hydrates, Annals of the New York Academy of Sciences Vol. 715, 450-462 (1994); J. Y. Zuo et al. "Representation of Hydrate Phase Equilibria in Aqueous Solutions of Methanol and Electrolytes Using an Equation of State," Energy and Fuels, 14, 19-24 (2000); and J. Y. Zuo et al., "A Thermodynamic Model for Gas Hydrates in the Presence of Salts and Methanol," Chem. Eng Comm., 184, 175-192 (2001), herein incorporated by reference in their entireties.

Examples of equations for extending the FHZ EOS model for predicting wax precipitation are described in H. Alboudwarej et al., "Effective Tuning of Wax Precipitation Models," 7th International Conference on Petroleum Phase Behavior and Fouling, Asheville, N.C., (2006); J. Y. Zuo et al., "An improved thermodynamic model for wax precipitation from petroleum fluids," Chemical Engineering Science, 56, 6941 (2001); and J. Y. Zuo et al., "Wax Formation from Synthetic Oil Systems and Reservoir Fluids," 11th International Conference on Properties and Phase Equilibria for Product and Process Design, Crete, Greece, May 20-25, (2007), herein incorporated by reference in their entireties.

An example of equations for extending the FHZ EOS model for predicting asphaltene precipitation is described in J. Du et al., "A Thermodynamic Model for the Predictions of Asphaltene Precipitation," Petroleum Science and Technology, 22, 1023 (2004), herein incorporated by reference in its entirety.

The evaluation module 118 can provide for construction of 3-D representations of the properties of the formation of interest over time as output by the simulator 120 for use in full-field evaluation. The evaluation module 118 can also provide 2-D representations of properties of the formation of interest over time as output by the simulator 120, such as cross-sections and 2-D radial grid views. In an illustrative embodiment, the evaluation module 118 can be used to evaluate the dynamic state of the reservoir during product and confirm or modify production forecasts and/or any uncertainties and risk factor associated therewith. The information provided by the evaluation module 118 can be used to update the reservoir development plan in the event that uncertainties or risks are unacceptable or new information is gathered. Changes or additions to equipment and operations of the reservoir development plan can be planned, and the modeling and simulation operations of the modules of the framework 100 can be repeated in an attempt to seek a more certain understanding of the planned production from the formation of interest over time.

When the reservoir development plan is complete, production from the reservoir may be carried out in accordance with a reservoir development plan. Production monitoring equipment can be used to gather information (e.g., historical field production pressures, pipelines pressures and flow rates, etc.). The reservoir development plan can be updated based upon such new information, and the reservoir simulator 120 can employ "history matching" where historical field production and pressures are compared to calculated values. The parameters of the reservoir simulator 120 may be adjusted until a reasonable match is achieved on a reservoir basis and usually for all wells. In an exemplary embodiment, producing water cuts or water-oil ratios and gas-oil ratios are matched.

Figure 3:
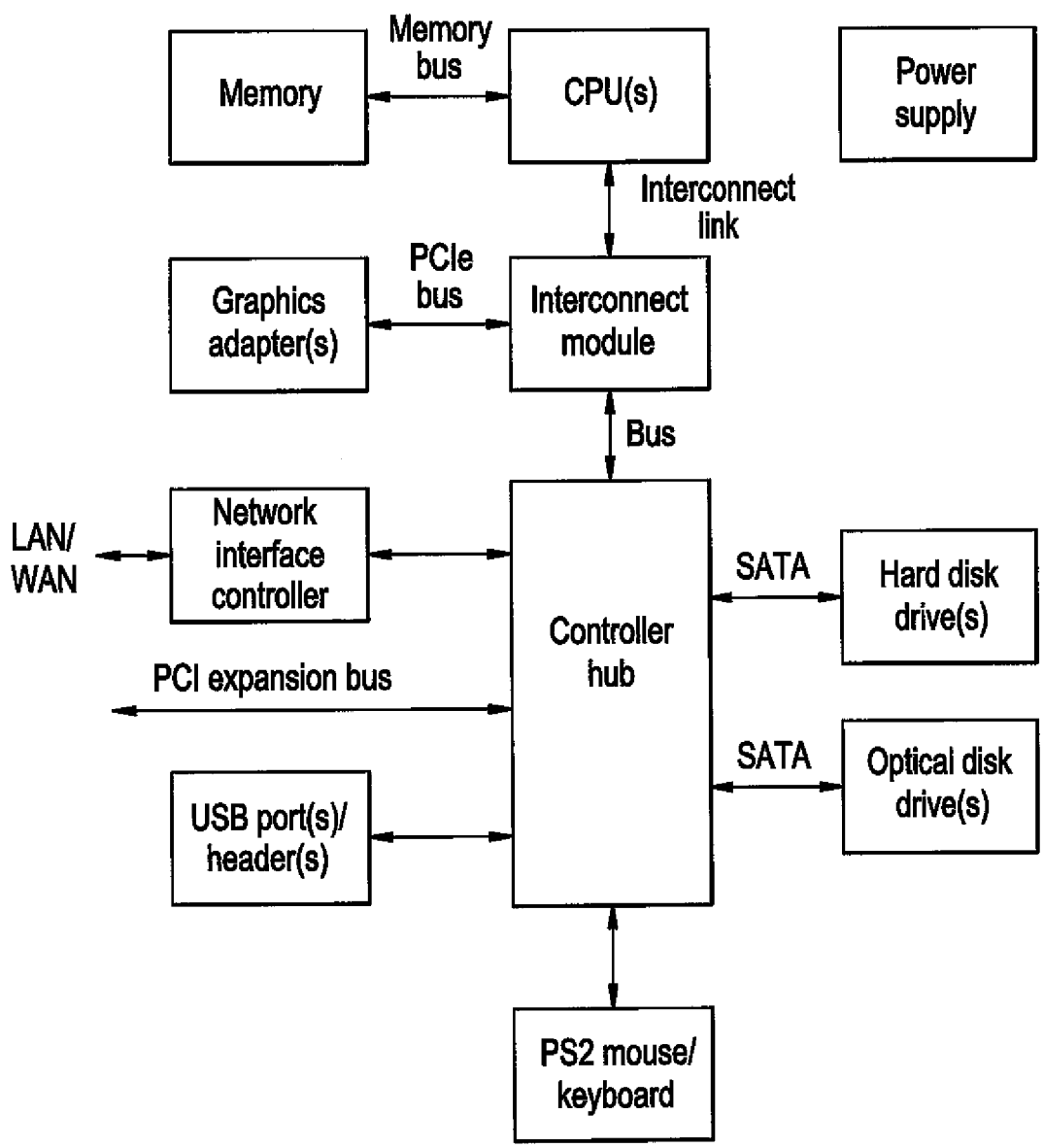
FIG. 3 is a functional block diagram of an exemplary computer workstation suitable for embodying the reservoir modeling software framework of FIG. 2.

In an exemplary embodiment, the reservoir modeling software framework 100 of FIG. 2 may be embodied as software modules executing on a computer workstation as shown in FIG. 3. The software modules can be persistently stored in the hard disk drive(s) of the workstation and loaded into memory for execution by the CPU(s) of the workstation. One or more of the modules of the framework 100, such as the geological model 104, gridding modules 108A, 108B, fluid property model 112, and fluid property mapper module 116 can be integrated as a part of the framework 100 or alternatively as plug-in module. A plug-in module may include software that adds specific capabilities to a larger host application (the framework 100). The host application may provide services which the plug-in can use, including, but not limited to, a way for plug-ins to register themselves with the host application and a protocol for the exchange of data with plug-ins. Plug-ins may depend on the services provided by the host application and might not work by themselves. Conversely, the host application may operate independently of the plug-ins, making it possible for end-users to add and update plug-ins dynamically without needing to make changes to the host application.

In alternate embodiments, the reservoir modeling software framework 100 of FIG. 2 can be embodied in a distributed computing environment (such as a computing cluster or grid) or in a cloud computing environment.

FIGS. 4A-4B depict an exemplary workflow for understanding a reservoir throughout the lifecycle of the reservoir in accordance with a first embodiment of the present invention. The workflow begins in block 401 by defining a reservoir assessment plan for a formation of interest. The goal of the reservoir assessment plan may be to derive an understanding of the structure and stratigraphy of the formation of interest as well as a forecast of the hydrocarbons that are contained in the formation of interest. The reservoir assessment plan may dictate a number of data gathering operations and analyses, such as well drilling and logging, seismic analysis, laboratory core and fluid analysis, and downhole fluid analysis, as described above. In block 403, economic and risk analysis can be integrated into the reservoir assessment plan. Risk and uncertainty analysis may include representing uncertainties with probabilities based on a distribution of the expected values of the uncertain variables. Sensitivity analysis can also be used to address uncertain variables. Economics analysis may assign costs to the equipment and operations that make up the reservoir assessment plan. In block 405, the data gathering operations and analyses dictated by the reservoir assessment plan of block 401 may be carried out. In an exemplary embodiment, the resultant data of block 405 may be stored in the data store 102 of the reservoir modeling software framework 100 of FIG. 2.

In block 407, the resultant data of block 405 may be operated on by a geologic modeler (e.g., geologic modeler 104 of FIG. 2) to generate a three-dimensional geological model of the formation of interest. The three-dimensional geological model may include a framework that provides a description of the structure and stratigraphy of the formation of interest. In an exemplary embodiment, the geological model constructed in block 407 may provide a basic description of the formation of interest in terms of dimensions and unconformities (e.g., fractures, layers and permeability barriers). Details of an exemplary geological model 106 are described above with respect to the framework 100 of FIG. 2. Block 407 may also perform gridding and upscaling operation on the geological model as required. Details of exemplary gridding and upscaling operations are described above with respect to modules 108A and 108B of the framework 100 of FIG. 2. The operations of block 407 may derive a reservoir simulation grid 110 constructed from a grid of cells that are associated with petrophysical properties such as porosity, permeability, initial interstitial fluid saturation, and relative permeability and capillary pressure functions. For a fractured reservoir, a dual-porosity model and/or a dual-permeability model can be used. Local grid refinements (a finer grid embedded inside of a coarse grid) can also be used, for example to more accurately represent the near-wellbore multi-phase flow effects.

In block 409, the, resultant data of block 405 may be operated on by a fluid property modeler (e.g., fluid property modeler 112 of FIG. 2) to generate a fluid property model that characterizes the fluid properties of the formation of interest. The fluid property modeler employs a particular equation of state model, referred to herein as the FHZ EOS, that derives property gradients, pressure gradients and temperature gradients as a function of depth in the formation of interest. These gradients may be incorporated as part of the fluid property model. The property gradients derived from the FHZ EOS may include mass fractions, mole fractions, molecular weights, and specific gravities for a set of pseudocomponents of the formation fluid. Such pseudocomponents may include a heavy pseudocomponent representing asphaltenes in the formation fluid, a second distillate pseudocomponent that represents the non-asphaltene liquid fraction of the formation fluid, and a third light pseudocomponent that represents gases in the formation fluid. The pseudocomponents derived from the FHZ EOS can also represent single carbon number (SCN) components as well as other fractions or lumps of the formation fluid (such as a water fraction) as desired. The FHZ EOS can predict compositional gradients (including, but not limited to, an asphaltene concentration gradient) with depth that take into account the impacts of gravitational forces, chemical forces, thermal diffusion, etc., as described above. As part of block 409, a Flory-Huggins solubility model can be used in conjunction with compositional gradients produced by the FHZ EOS to derive a concentration profile of asphaltene pseudocomponents (e.g., asphaltene nanoaggregates and larger asphaltene clusters) and corresponding aggregate size of asphaltenes as a function of depth in the formation of interest as described above. The asphaltene concentration gradient can also be used to predict gradients for fluid properties (such as fluid density and fluid viscosity) that relate to asphaltene content. Details of an exemplary fluid property model 114 are described above with respect to the framework 100 of FIG. 2.

In block 411, the reservoir simulation grid derived in block 407 is initialized by mapping or interpolating the fluid properties of the formation fluids as represented by the fluid property model of block 411 to the grid cells of the reservoir simulation grid. Details of exemplary operations in carrying out such property transformations is described above with the respect to the module 116 of the framework 100 of FIG. 2.

In block 413, one or more users may review and analyze the information stored in the resultant reservoir simulation grid of block 411 in order to understand the structural properties and fluid properties of the formation of interest. For example, the evaluation module 118 of the framework 100 of FIG. 2 may provide for rendering of 3-D representations of properties of the formation of interest for use in full-field visualization. The evaluation module 118 can also display 2-D representations of properties of the formation of interest, such as cross-sections and 2-D radial grid views. In an illustrative embodiment, the evaluation module 118 can be used to characterize the reservoir (i.e., evaluate the static state of the reservoir before any production) and identify, confirm or modify reserves forecasts for the formation of interest and/or any uncertainties and risk factor associated therewith.

In an exemplary embodiment, the evaluation module 118 of framework 100 of FIG. 2 may render and display a 3-D representation of the predicted fluid properties (such as gradients in predicted asphaltene concentration, predicted fluid density, predicted fluid viscosity, etc., which are based on the predictions of the fluid property model of block 411), measured fluid properties (such as gradients in measured asphaltene concentration, measured fluid density, measured fluid viscosity, etc., which may be based on the data acquisition of block 405 and stored in the data store 102), and representations of structural horizons and faults. The information displayed by the evaluation module 118 allows the user to evaluate the presence or absence of flow barriers in the formation. It can include other useful information such as other predicted property gradients, other measured property gradients, and measured geochemical fingerprints from reservoir fluid samples that characterize the reservoir fluids.

The user can view and navigate over the 3D representation to assess reservoir compartmentalization (i.e., the presence or absence of flow barriers in the formation). More specifically, the presence of a flow barrier is indicated by discontinuities in the fluid properties (including, but not limited to, the asphaltene concentration gradient) of the reservoir simulation grid as well as discontinuities in the downhole fluid analysis measurements for corresponding well locations. Moreover, the presence of a flow barrier can be indicated by disagreement between measured asphaltene concentration and the predicted asphaltene concentration produced by the FHZ EOS modeling, even for those cases where there is no corresponding discontinuity in the fluid properties. The presence of a flow barrier is also indicated by a structural fault at corresponding locations. Such analysis can also be extended for assessment of flow barriers in a formation with multiple wells (i.e., multiwell analysis). In this scenario, if there is different compositional gradient between wells, this is an indication that there is a flow barrier (seal) between the wells or parts of the wells.

In block 415, the information derived by user review and analysis of the information stored in the resultant reservoir simulation grid in block 413 can be used to update (or optimize) the reservoir assessment plan in the event that uncertainties or risks are unacceptable or new information is gathered. For example, additional data acquisition and testing can be added to the reservoir assessment plan that is intended to reduce the uncertainty as to flow barriers identified by the analysis of block 413.

In block 417, it may be determined whether the reservoir assessment plan is complete. If not, the workflow returns to block 405 to carry out such additional tests in order to acquire additional data, and the modeling and simulation operations of the modules of the framework 100 can be repeated (blocks 407 to 415) in an attempt to seek a more certain understanding of the formation of interest.

In the event that assessment is complete, the operations may continue to block 419 wherein a reservoir development plan may be defined. The reservoir development plan may define a strategy for producing hydrocarbons from the formation of interest, such as the number, location and trajectory of wells, the completion apparatus of wells, artificial lift mechanisms, enhanced recovery mechanisms (such as water flooding, steam injection for heavy oil, hydraulic fracturing for shale gas and the like), pipeline systems, facilities, and the expected production of fluids (gas, oil, water) from the formation.

In block 421, economic and risk analysis can be integrated into the reservoir development plan. Risk and uncertainty analysis may include representing uncertainties with probabilities based on a distribution of the expected values of the uncertain variables. Sensitivity analysis can also be used to address uncertain variables. Economics analysis may assign costs to the equipment and operations that make up the reservoir development plan.

In block 423, details of the reservoir development plan may be input to a reservoir simulator (such as the simulator module 120 of the framework 100 of FIG. 2). The reservoir simulator may derive computational equations and associated time-varying data that represent the details of reservoir development plan over time. The computational equations derived by the reservoir simulator in block 423 may be based on the FHZ EOS that is employed by the fluid property modeling in step 409. As described above, the equations of the FHZ EOS can be extended to derive and simulate a variety of properties of the reservoir fluid, including, but not limited to:

i) PVT properties (e.g., phase envelope, pressure-temperature (PT) flash, constant composition expansion (CCE), differential liberation (DL), constant volume depletion (CVD));

ii) gas hydrate formation;

iii) wax precipitation;

iv) asphaltene precipitation; and v) scaling prediction.

In block 425, the reservoir simulator may initialize the reservoir simulation grid with the rock properties and fluid properties stored in the reservoir simulation grid upon completion of reservoir characterization (or updated thereafter in block 415).

In block 427, the reservoir simulator may utilize the computational equations and associated time varying data representing the reservoir development plan as derived in block 423 together with the rock properties and fluid properties stored in the reservoir simulation grid initialized in block 425 to derive the pressure and fluid saturations (e.g., volume fractions) for each cell of the simulation grid as well as the production of each phase (i.e., gas, oil, water) over a number of time steps. In an exemplary embodiment, the reservoir simulator carries out finite difference simulation as described above with respect to the reservoir simulator 120 of FIG. 2. The simulation can also be used to simulate a variety of properties of the reservoir fluid during reservoir development, such as predicting gas hydrate formation, wax precipitation, asphaltene precipitation, and scaling. These properties can be used to identify and evaluate flow assurance problems as well as possible remediation strategies.

In block 429, one or more users may review and analyze the properties of the formation of interest over time as output by the reservoir simulator in block 427. For example, the evaluation module 118 of the framework 100 of FIG. 2 may provide for construction of 3-D representations of the properties of the formation of interest over time as output by the simulator for use in full-field evaluation. The evaluation module 118 can also provide 2-D representations of properties of the formation of interest over time as output by the simulator, such as cross-sections and 2-D radial grid views. In an illustrative embodiment, the evaluation module 118 can be used to evaluate the dynamic state of the reservoir during production and confirm or modify production forecasts and/or any uncertainties and risk factor associated therewith.

In block 431, the information derived by user review and analysis of the simulation results in block 429 can be used to update (or optimize) the reservoir development plan in the event that uncertainties or risks are unacceptable or new information is gathered.

In block 433, it may be determined whether the reservoir development plan is complete. If not, changes or additions to the equipment and operations of the reservoir development plan can be planned and the workflow returns to blocks 423 to repeat the modeling and simulation operations of blocks 423 to 431 in an attempt to seek a more certain understanding of the planned production from the formation of interest over time.

In the event that the reservoir development plan is complete, the operations may continue to block 435 wherein production may be carried out in accordance with the reservoir development plan. In block 437, production monitoring equipment can be used to gather information (e.g., historical field production pressures, pipelines pressures and flow rates, etc.).

In block 439, the reservoir development plan can be updated based upon the production information gathered in block 437 or other new information. If this occurs, the workflow can return to blocks 423 to 431 for modeling and simulation of the reservoir. In this iteration, the reservoir simulator can employ "history matching" where historical field production and pressures may be compared to calculated values. The parameters of the reservoir simulator may be adjusted until a reasonable match is achieved on a reservoir basis and usually for all wells. Producing water cuts or water-oil ratios and gas-oil ratios may be matched. These operations can be repeated until production is complete (block 441) in order to optimize production decisions over the time of production of the reservoir.

Figure 5B:
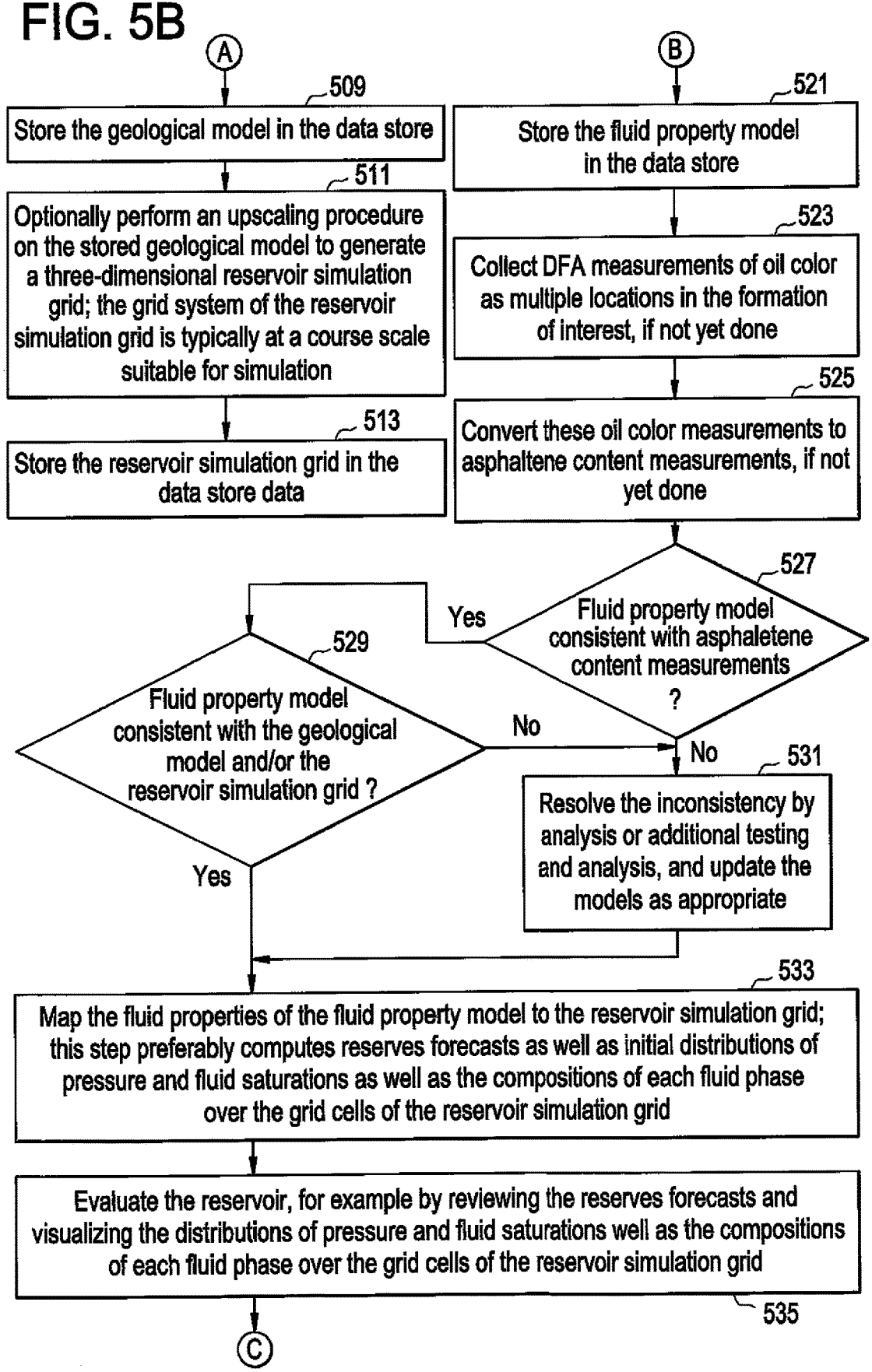
Figure 5C:
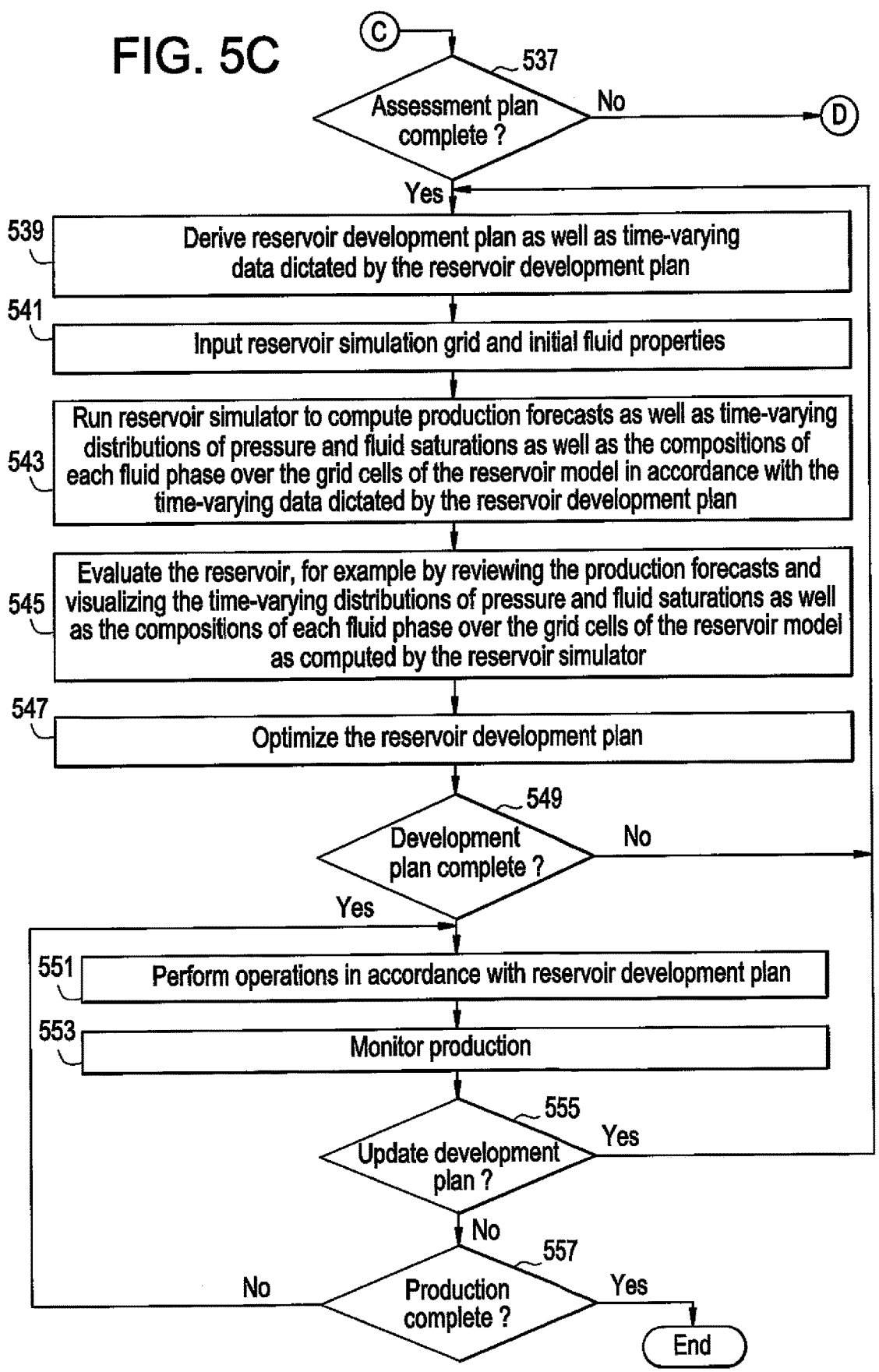

FIGS. 5A-5C depict a workflow for understanding a reservoir throughout the lifecycle of the reservoir in accordance with a second embodiment of the present invention. The workflow begins in block 501 by defining a reservoir assessment plan for a formation of interest. The goal of the reservoir assessment plan may be to derive an understanding of the structure and stratigraphy of the formation of interest as well as a forecast of the hydrocarbons that are contained in the formation of interest. The reservoir assessment plan may dictate a number of data gathering operations and analyses, such as well drilling and logging, seismic analysis, laboratory core and fluid analysis, and downhole fluid analysis that characterize rock properties (e.g., lithology, fractures, porosity, permeability, water saturation, oil saturation) and fluid properties (e.g., fluid density, fluid viscosity, compositional components, GOR, formation volume factors, pressure, temperature, PH, color, others) as a function of location in the formation of interest as described above. Economic and risk analysis can be integrated into the reservoir assessment plan. Risk and uncertainty analysis may include representing uncertainties with probabilities based on a distribution of the expected values of the uncertain variables. Sensitivity analysis can also be used to address uncertain variables. Economics analysis may assign costs to the equipment and operations that make up the reservoir assessment plan.

In block 503, rock property testing and analysis operations (e.g., well drilling and logging, seismic analysis, and laboratory core analysis) may be performed as dictated by the reservoir assessment plan of block 501. In block 505, the resultant rock property data of block 503 may be stored in the data store 102 of the reservoir modeling software framework 100 of FIG. 2.

In block 507, the resultant rock property data of block 503 may be loaded from the data store 102 and operated on by the geologic modeler 104 of FIG. 2 (e.g., Petrel Reservoir Modeling Software of Schlumberger Information Systems of Houston, Tex.) to generate a three-dimensional geological model of the formation of interest. The three-dimensional geological model is a framework that provides a description of the structure and stratigraphy of the formation of interest. In an exemplary embodiment, the geological model constructed in block 507 may provide a basic description of the formation of interest in terms of dimensions and unconformities (e.g., fractures, layers and permeability barriers). Details of an exemplary geological model 106 are described above with respect to the framework 100 of FIG. 2. In block 509, the three-dimensional geological model derived in block 507 may be stored in the data store 102 of FIG. 2.

In block 511, gridding and upscaling operations may be performed on the geological model stored in block 509 as required. Details of exemplary gridding and upscaling operations are described above with respect to modules 108A and 108B of the framework 100 of FIG. 2. The operations of block 511 may derive a reservoir simulation grid constructed from a grid of cells that are associated with petrophysical properties such as porosity, permeability, initial interstitial fluid saturation, and relative permeability and capillary pressure functions. For a fractured reservoir, a dual-porosity model and/or a dual-permeability model can be used. Local grid refinements (a finer grid embedded inside of a coarse grid) can also be used, for example to more accurately represent the near-wellbore multi-phase flow effects. In block 513, the three-dimensional reservoir simulation grid derived in block 511 may be stored in the data store 102 of FIG. 2.

In block 515, fluid property testing and analysis operations (e.g., laboratory core fluid analysis and downhole fluid analysis) may be performed as dictated by the reservoir assessment plan of block 501. In block 517, the resultant fluid property data of block 515 may be stored in the data store 102 of the reservoir modeling software framework 100 of FIG. 2.

In block 519, the resultant fluid property data of block 515 may be loaded from the data store 102 and may be operated on by the fluid property modeler 112 of FIG. 2 to generate a fluid property model that characterizes the fluid properties of the formation of interest. The fluid property modeler 112 may employ the FHZ EOS in order to derive property gradients, pressure gradients and temperature gradients as a function of depth in the formation of interest. These gradients may be incorporated as part of the fluid property model. The property gradients derived from the FHZ EOS may include mass fractions, mole fractions, molecular weights, and specific gravities for a set of pseudocomponents of the formation fluid. Such pseudocomponents may include a heavy pseudocomponent representing asphaltenes in the formation fluid, a second distillate pseudocomponent that represents the non-asphaltene liquid fraction of the formation fluid, and a third light pseudocomponent that presents gases in the formation fluid. The pseudocomponents derived from the FHZ EOS can also represent single carbon number (SCN) components as well as other fractions or lumps of the formation fluid (such as a water fraction) as desired. The FEZ EOS can predict compositional gradients (including, but not limited to, an asphaltene concentration gradient) with depth that takes into account the impacts of gravitational forces, chemical forces, thermal diffusion, etc. as described above. As part of block 519, a Flory-Huggins solubility model can be used in conjunction with compositional gradients produced by the FHZ EOS to derive a concentration profile of asphaltene pseudocomponents (e.g., asphaltene nanoaggregates and larger asphaltene clusters) and corresponding aggregate size of asphaltenes as a function of depth in the formation of interest as described above. The asphaltene concentration gradient can also be used to predict gradients for fluid properties (such as fluid density and fluid viscosity) that relate to asphaltene content. Details of an exemplary fluid property model 114 are described above with respect to the framework 100 of FIG. 2. In block 521, the fluid property model derived in block 519 is stored in the data store 102 of FIG. 2.

In block 523, downhole fluid analysis measurements of color of the formation fluids can be acquired at multiple locations in the formation, if not yet acquired as part of block 501. For example, the Quicksilver probe and InSitu fluid analyzer commercially available from Schlumberger can be used to perform such formation fluid color measurements.

In block 525, the formation fluid color measurements of block 523 may be converted to asphaltene concentration measurements, if not yet converted as part of the block 501. In an exemplary embodiment, this conversion may employ an empirical relation of the form:

$$OD_{DFA}=C1*W_a+C2,$$

where $OD_{DFA}$ is the measured color (i.e., optical density) of the formation fluid at a particular wavelength (this particular wavelength can vary over different reservoirs, but usually it will be in the ultra-violet or visible parts of the spectrum);

$W_a$ is the corresponding mass fraction of asphaltenes; and

C1 and C2 are constants derived from empirical data, C1 being in the range of 0.1-30, and C2 close to 0.

In block 527, it may be determined if the asphaltene property gradient of the fluid property model as derived in block 519 is consistent with the asphaltene concentration measurements of block 525. In an exemplary embodiment, the consistency check of block 527 determines whether the measured asphaltene concentration gradient is far from the predicted asphaltene concentration gradient. It can also involve comparisons between the other measured property gradients and corresponding predicted property gradients. If there are significant differences, it can be inferred that measurement errors have occurred (such as a tool failure) and the corresponding measurements may be disregarded (and possibly corrected if possible). This makes the analysis more robust. In an exemplary embodiment, the evaluation module 118 generates a graphical user interface screen that displays simultaneously the measured compositions, predicted properties, and measured properties, in order to allow a user to efficiently and effectively compare the measured and predicted properties to identify incorrect measurements.

In block 529, it may be determined if the fluid property model as derived in block 519 is consistent with the geological model of block 507 and/or the initial reservoir simulation grid of block 511. In an exemplary embodiment, the evaluation module 118 may generate a graphical user interface screen that displays the geologic model (in an exemplary embodiment, highlighting potential flow barriers) overlayed with the predicted fluid properties derived from the property modeler 112 as well as the measured fluid properties derived from downhole fluid analysis (or laboratory analysis). This interface allows the user to efficiently and effectively identify inconsistencies geological model of block 507 and/or the initial reservoir simulation grid of block 511. The graphical user interface can also depict other fluid properties (such as pressure) as a function of location in the reservoir in order to visually convey complimentary information regarding connectivity.

In the event that either one of the consistency checks of blocks 527 and 529 fails, the operations may continue to block 531 to resolve the inconsistency by analysis or additional testing and analysis. The fluid property model, the geological model and/or the initial reservoir simulation grid may be updated as appropriate in resolving the inconsistency as part of block 531. The predicted asphaltene property gradient of the fluid property model may be derived from the FHZ EOS as described above. The FHZ EOS may assume that the reservoir is connected and has achieved thermodynamic equilibrium (at least the asphaltenes have achieved thermodynamic equilibrium) over a range of depth of interest. If the asphaltene concentration measurements of block 525 are consistent with the predicted asphaltene property gradient of the fluid property model, this result may suggest that the fluid property model accurately captures reservoir connectivity. If the asphaltene concentration measurements of block 525 are not consistent with the predicted asphaltene property gradient of the fluid property model, this result may suggest that the fluid property model does not accurately capture reservoir connectivity. In this case, the formation of interest may be studied further to check for non-equilibrium and/or sealing barriers, and the reservoir model may have to be redefined. It has been found that when the FHZ EOS does not accurately predict the asphaltene compositional gradient, there are likely previously unidentified barriers compartmentalizing the reservoir.

In the event that the consistency checks of blocks 527 and 529 pass (or the inconsistencies are resolved in block 531), the operations continue to block 533 wherein the reservoir simulation grid stored in block 513 (or updated in block 531) may be initialized by mapping or interpolating the fluid properties of the formation fluids as represented by the fluid property model of block 519 (or updated as part of block 531) to the grid cells of the reservoir simulation grid. Details of exemplary operations in carrying out such property transformations is described above with the respect to the module 116 of the framework 100 of FIG. 2.

In block 535, one or more users may review and analyze the information stored in the resultant reservoir simulation grid of block 411 in order to understand the structural properties and fluid properties of the formation of interest. For example, the evaluation module 118 of the framework 100 of FIG. 2 may provide for rendering of 3-D representations of properties of the formation of interest for use in full-field visualization. For example, such visualization can depict pressures and fluid saturations as well as compositions of each fluid phase over the grid cells of the simulation grid. The evaluation module 118 can also display 2-D representations of properties of the formation of interest, such as cross-sections and 2-D radial grid views. In the illustrative embodiment, the evaluation module 118 can be used to characterize the reservoir (i.e., evaluate the static state of the reservoir before any production) and identify, confirm or modify reserves forecasts for the formation of interest and/or any uncertainties and risk factor associated therewith. As part of block 535, the information derived by user review and analysis of the information stored in the resultant reservoir simulation grid in block 413 can be used to update (or optimize) the reservoir assessment plan in the event that uncertainties or risks are unacceptable or new information is gathered.

In an exemplary embodiment, the evaluation module 118 of framework 100 of FIG. 2 may render and display a 3-D representation of the predicted fluid properties (such as gradients in predicted asphaltene concentration, predicted fluid density, predicted fluid viscosity, etc., which are based on the predictions of the fluid property modeling), measured fluid properties (such as gradients in measured asphaltene concentration, measured fluid density, measured fluid viscosity, etc., which are based on the reservoir fluid analysis and stored in the data store 102), and representations of structural horizons and faults. The information displayed by the evaluation module 118 may allow a user to evaluate the presence or absence of flow barriers in the formation. It can include other useful information, such as other predicted property gradients, other measured property gradients, and measured geochemical fingerprints from reservoir fluid samples that characterize the reservoir fluid. The user can view and navigate over the 3D representation to assess reservoir compartmentalization (i.e., the presence or absence of flow barriers in formation). More specifically, the presence of a flow barrier is indicated by discontinuities in the fluid properties (including, but not limited to, the asphaltene concentration gradient) of the reservoir simulation grid as well as discontinuities in the downhole fluid analysis measurements for corresponding well locations. Moreover, the presence of a flow barrier can be indicated by disagreement between measured asphaltene concentration and the predicted asphaltene concentration produced by the FHZ EOS modeling, even for those cases where there is no corresponding discontinuity in the fluid properties. The presence of a flow barrier may also be indicated by a structural fault at corresponding locations. Such analysis can also be extended for assessment of flow barriers in a formation with multiple wells (i.e., multiwell analysis). In this scenario, if there is different compositional or property gradient between wells, this may be an indication that there is a flow barrier (seal) between the wells or parts of the wells.

In block 537, it may be determined whether the reservoir assessment plan is complete. If not, changes or additions to the tests and analyses of the assessment plan can be planned and the workflow returns to block 510 to carry out such additional tests in order to acquire additional data, and the modeling and simulation operations of the modules of the framework 100 can be repeated (blocks 503 to 535) in an attempt to seek a more certain understanding of the formation of interest.

In the event that assessment is complete, the operations may continue to block 539 wherein a reservoir development plan may be defined. The reservoir development plan defines a strategy for producing hydrocarbons from the formation of interest, such as the number, location and trajectory of wells, the completion apparatus of wells, artificial lift mechanisms, enhanced recovery mechanisms (such as water flooding, steam injection for heavy oil, hydraulic fracturing for shale gas and the like), pipeline systems, facilities, and the expected production of fluids (gas, oil, water) from the formation. As part of block 539, economic and risk analysis can be integrated into the reservoir development plan. Risk and uncertainty analysis may involve representing uncertainties with probabilities based on a distribution of the expected values of the uncertain variables. Sensitivity analysis can also be used to address uncertain variables. Economics analysis may assign costs to the equipment and operations that make up the reservoir development plan. As part of part of block 539, computational equations and associated time-varying data that represent the details of reservoir development plan over time may be input (or derived by) the reservoir simulator 120 of FIG. 2. The computational equations derived by the reservoir simulator in block 539 may be based on the FEZ EOS that is employed by the fluid property modeling in step 519. As described above, the equations of the FHZ EOS can be extended to derive and simulate a variety of properties of the reservoir fluid, including, but not limited to:

i) PVT properties (e.g., phase envelope, pressure-temperature (PT) flash, constant composition expansion (CCE), differential liberation (DL), constant volume depletion (CVD));

ii) gas hydrate formation;

iii) wax precipitation;

iv) asphaltene precipitation; and v) scaling prediction.

In block 541, the reservoir simulator 120 may initialize the reservoir simulation grid with the rock properties and fluid properties stored in the reservoir simulation grid upon completion of reservoir characterization of block 535 (or updated thereafter).

In block 543, the reservoir simulator 120 may utilize the computational equations and associated time varying data representing the reservoir development plan as derived in block 539 together with the rock properties and fluid properties stored in the reservoir simulation grid initialized in block 541 to derive the pressure and fluid saturations (e.g., volume fractions) for each cell of the simulation grid as well as the production of each phase (i.e., gas, oil, water) over a number of time steps. In an exemplary embodiment, the reservoir simulator 120 may carry out finite difference simulation as described above. The simulation can also be used to simulate a variety of properties of the reservoir fluid during reservoir development, such as predicting gas hydrate formation, wax precipitation, asphaltene precipitation, and scaling. These properties can be used to identify and evaluate flow assurance problems as well as possible remediation strategies.

In block 545, one or more users may review and analyze the properties of the formation of interest over time as output by the reservoir simulator in block 543. For example, the evaluation module 118 of the framework 100 of FIG. 2 may provide for rendering of 3-D representations of the properties of the formation of interest over time as output by the simulator 120 for use in full-field visualization. The evaluation module 118 can also display 2-D representations of properties of the formation of interest over time as output by the simulator 120, such as cross-sections and 2-D radial grid views. In the illustrative embodiment, the evaluation module 118 can be used to evaluate the dynamic state of the reservoir during production and confirm or modify production forecasts and/or any uncertainties and risk factor associated therewith.

In block 547, the information derived by user review and analysis of the simulation results in block 429 can be used to update (or optimize) the reservoir development plan in the event that uncertainties or risks are unacceptable or new information is gathered.

In block 549, it may be determined whether the reservoir development plan is complete. If not, changes or additions to the equipment and operations of the reservoir development plan can be planned and the workflow may return to block 539 to repeat the modeling and simulation operations of blocks 539 to 547 in an attempt to seek a more certain understanding of the planned production from the formation of interest over time.

In the event that the reservoir development plan is complete, the operations may continue to block 551 wherein production may be carried out in accordance with the reservoir development plan. In block 553, production monitoring equipment can be used to gather information (e.g., historical field production pressures, pipelines pressures and flow rates, etc.).

In block 555, the reservoir development plan can be updated based upon the production information gathered in block 553 or other new information. If this occurs, the workflow can return to blocks 539 to 547 for modeling and simulation of the reservoir. In this iteration, the reservoir simulator can employ "history matching" where historical field production and pressures may be compared to calculated values. The parameters of the reservoir simulator may be adjusted until a reasonable match is achieved on a reservoir basis and usually for all wells. In an embodiment, producing water cuts or water-oil ratios and gas-oil ratios may be matched. These operations can be repeated until production is complete (block 557) in order to optimize production decisions over the time of production of the reservoir.

Advantageously, the present invention may automate the application of the FHZ EOS model calculations to the reservoir modeling and simulation framework, which may allow reservoir compartmentalization (the presence or absence of flow barrier in the reservoir) to be assessed more quickly and easily. Additionally, automated integration of FHZ EOS model calculations into the reservoir modeling and simulation framework may allow the compositional gradients produced by the FHZ EOS model calculations (particularly asphaltene concentration gradients) to be combined with other data, such as geologic and other petrophysical data, which may allow for more accurate assessment of reservoir compartmentalization.

There have been described and illustrated herein several embodiments of a method and system for modeling, evaluating and simulating hydrocarbon bearing subterranean formations. While particular embodiments of the invention have been described, it is not intended that the invention be limited thereto, as it is intended that the invention be as broad in scope as the art will allow and that the specification be read likewise. Thus, while particular data acquisition methodologies and tools have been disclosed, it will be appreciated that other data acquisition methodologies and tools may be within the scope of the present disclosure as well. In addition, while particular types of geological models, fluid property models and reservoir simulation models have been disclosed, it will be understood that similar models can be used. Moreover, while particular configurations of the modeling framework have been disclosed, it will be appreciated that other configurations could be used as well. It will therefore be appreciated by those skilled in the art that yet other modifications could be made to the provided invention without deviating from its spirit and scope as claimed.

What is claimed is:

1. A method for evaluating a subterranean formation, the method comprising:

receiving data representing one or more physical characteristics of the formation, wherein the data was collected by one or more devices deployed in or near the formation;

deriving a first model of the formation, the first model representing rock properties as a function of location in the formation;

deriving a second model of the formation, the second model representing fluid properties as a function of location in the formation, wherein the fluid properties of the second model characterize asphaltene concentration as a function of location in the formation;

identifying reservoir compartments of the formation based on the asphaltene concentration as a function of location in the formation;

deriving a third model of the formation, the third model including rock properties as a function of location in the formation that are based on the rock properties of the first model, and the third model also including fluid properties as a function of location in the formation that are based on the fluid properties of the second model, wherein the fluid properties of the third model characterize asphaltene concentration as a function of location in the formation, wherein deriving the third model comprises interpolating the fluid properties of the second model to grid cells of the third model, and wherein the interpolating is performed separately for the grid cells representing the individual reservoir compartments of the formation; and simulating fluid flow in the third model based on the fluid properties of the second model and the rock properties of the first model.

2. A method according to claim 1, wherein:
the second model represents a continuous change in certain fluid properties as a function of location in the formation.

3. A method according to claim 1, further comprising:
characterizing asphaltene concentration as a function of location in the formation;
comparing the asphaltene concentration as a function of location in the formation resultant from said characterizing to corresponding predictions of asphaltene concentration in the formation as represented by the second model; and
selectively integrating the fluid properties of the second model into the third model based upon the results of said comparing.

4. A method according to claim 3, wherein:
the fluid properties of the second model are integrated into the third model only if the asphaltene concentration as a function of location in the formation resultant from said characterizing is consistent with corresponding predictions of asphaltene concentration in the formation as represented by the second model.

5. A method according to claim 3, wherein:
asphaltene concentration as a function of location in the formation is characterized from fluid analysis selected from a group consisting of: i) downhole fluid color measurements performed within a wellbore traversing the formation, and ii) laboratory fluid color measurements.

6. A method according to claim 5, wherein:
the downhole fluid color measurements are converted to asphaltene concentration measurements.

7. A method according to claim 1, wherein:
the fluid properties of the second model are selectively integrated into the third model based upon a determination of consistency between the fluid properties of the second model and the rock properties of one of the first model and third model.

8. A method according to claim 1, further comprising:
visualizing the properties of the third model to evaluate the presence or absence of flow barriers in the formation.

9. A method according to claim 8, wherein visualizing comprises displaying information that describes the formation in order to evaluate the presence or absence of flow barriers in the formation, wherein said information is selected from a group consisting of: predicted asphaltene concentration gradients defined by the third model, measured asphaltene concentration gradients, structural faults defined by the third model, predicted fluid density gradient defined by the third model, measured fluid density gradient, predicted fluid viscosity gradient defined by the third model, measured fluid viscosity gradient, other predicted property gradients defined by the third model, other measured property gradients, and measured geochemical fingerprints.

10. A method according to claim 8, wherein:
the visualizing is performed for multiple wellbores that traverse the formation in order to evaluate the presence or absence of flow barriers between the multiple wellbores.

11. A method according to claim 8, wherein:
the visualizing is used to update a reservoir assessment plan for the formation.

12. A method according to claim 11, wherein:
the reservoir assessment plan is updated to define data acquisition operations that are intended to reduce uncertainty with respect to the presence or absence of flow barriers in the formation.

13. A method according to claim 1, wherein:
the third model is used to simulate production of fluids from the formation over time.

14. A method according to claim 1, wherein:
the second model is derived by solving an equation of state model that characterizes asphaltene concentration as a function of location in the formation.

15. A method according to claim 14, wherein:
the equation of state model derives property gradients, pressure gradients and temperature gradients as a function of depth in the formation.

16. A method according to claim 15, wherein:
the property gradients derived from the equation of state model comprise one or more of mass fractions, mole fractions, molecular weights, and specific gravities for a set of pseudocomponents of a formation fluid.

17. A method according to claim 16, wherein:
said set of pseudocomponents include a heavy pseudocomponent representing asphaltenes in the formation fluid, a second distillate pseudocomponent that represents a non-asphaltene liquid fraction of the formation fluid, and a third light pseudocomponent that represents gases in the formation fluid.

18. A method according to claim 16, wherein:
said set of pseudocomponents represents single carbon number (SCN) components as well as other fractions of the formation fluid.

19. A method according to claim 14, wherein:
the equation of state model predicts compositional gradients with depth based at least partially on at least one factor selected from the group consisting of gravitational forces, chemical forces, and thermal diffusion.

20. A method according to claim 19, wherein:
the characterization of asphaltene concentration as a function of depth as derived from the equation of state model is used to generate a concentration profile of asphaltene pseudocomponents and corresponding aggregate size of asphaltenes as a function of location in the formation.

21. A method according to claim 20, wherein:
the asphaltene pseudocomponents comprise asphaltene nanoaggregates and larger asphaltene clusters.

22. A method according to claim 14, wherein:
the characterization of asphaltene concentration as a function of depth as derived from the equation of state model is used to predict gradients for at least one particular fluid property that relates to asphaltene concentration, the particular fluid property selected from the group consisting of fluid density and fluid viscosity.

23. The method of claim 1, wherein the first model has a first grid system, and the third model has a second grid system that is coarser than said first grid system.

24. The method of claim 1, further comprising adjusting a reservoir development plan based on the simulation of fluid flow in the third model.

25. The method of claim 24, wherein the reservoir development plan comprises two or more factors selected from the group consisting of: a number and location of wells in the formation, a completion apparatus for one or more of the wells, an artificial lift mechanism, an enhanced recovery mechanism, a pipeline system, and an expected production of fluids from the formation.

26. The method of claim 25, wherein simulating the fluid flow in the third model comprises simulating the fluid flow based in part on the two or more factors of the reservoir development plan.

27. A computer processing system comprising:
one or more processors; and
a memory system comprising one or more non-transitory computer-readable media storing instructions that, when executed by at least one of the one or more processors, cause the computer processing system to perform operations, the operations comprising:
receiving data representing one or more physical characteristics of a subterranean formation, wherein the data was collected by one or more devices deployed in or near the formation;
obtaining a first model of the formation, the first model representing rock properties as a function of location in the formation;
generating a second model of the formation, the second model representing fluid properties as a function of location in the formation, wherein the fluid properties of the second model characterize asphaltene concentration as a function of location in the formation;
identifying reservoir compartments of the formation based at least partially on the asphaltene concentration as a function of location in the formation;
deriving a reservoir simulation model of the formation, the reservoir simulation model including rock properties as a function of location in the formation that are based on the rock properties of the first model, and the reservoir simulation model also including fluid properties as a function of location in the formation that are based on the fluid properties of the second model, wherein the fluid properties of the reservoir simulation model characterize asphaltene concentration as a function of location in the formation, wherein deriving the reservoir simulation model comprises mapping the fluid properties of the second model to grid cells of the reservoir simulation model, and wherein the mapping is performed separately for the grid cells repersenting the individual reservoir compartments of the formation; and
simulating fluid flow in the reservoir simulation model based on the fluid properties of the second model and the rock properties of the first model.

28. The computer processing system of claim 27, wherein:
the second model represents a continuous change in certain fluid properties as a function of location in the formation.

29. The computer processing system of claim 27, wherein:
the first model provides a description of a structure and stratigraphy of the formation.

30. The computer processing system of claim 27, wherein:
the first model provides a basic description of the formation in terms of dimensions and unconformities.

31. The computer processing system of claim 27, wherein deriving the reservoir simulation model comprises gridding and upscaling the first model.

32. The computer processing system of claim 27, wherein deriving the reservoir simulation model comprises mapping the fluid properties of the second model into the reservoir simulation model.

33. The computer processing system of claim 27, wherein:
the second model comprises a fluid property model derived from downhole fluid analysis measurements within a wellbore that traverses the formation.

34. The computer processing system of claim 27, wherein:
asphaltene concentration as a function of location in the formation is characterized from fluid analysis selected from the group consisting of: i) downhole fluid color measurements performed within a wellbore traversing the formation, and ii) laboratory fluid color measurements.

35. The computer processing system of claim 24, wherein:
the downhole fluid color measurements are converted to asphaltene concentration measurements.

36. The computer processing system of claim 27, wherein the operations further comprise:
visualizing one or more properties of the reservoir simulation model to evaluate the presence or absence of flow barriers in the formation.

37. The computer processing system of claim 36, wherein visualizing comprises displaying information that describes the formation in order to evaluate the presence or absence of flow barriers in the formation, wherein said information is selected from the group consisting of predicted asphaltene concentration gradients defined by the reservoir simulation model, measured asphaltene concentration gradients, structural faults defined by the reservoir simulation model, predicted fluid density gradient defined by the reservoir simulation model, measured fluid density gradient, predicted fluid viscosity gradient defined by the reservoir simulation model, measured fluid viscosity gradient, other predicted property gradients defined by the reservoir simulation model, other measured property gradients, and measured geochemical fingerprints.

38. The computer processing system of claim 36, wherein visualizing comprises visualizing multiple wellbores that traverse the formation in order to evaluate the presence or absence of flow barriers between the multiple wellbores.

39. The computer processing system of claim 27, wherein deriving the second model comprises solving an equation of state that characterizes asphaltene concentration as a function of location in the formation.

40. The computer processing system of claim 39, wherein solving the equation of state comprises deriving property gradients, pressure gradients and temperature gradients as a function of depth in the formation.

41. The computer processing system of claim 40, wherein the property gradients derived from the equation of state comprise at least one property selected from the group consisting of mass fractions, mole fractions, molecular weights, and specific gravities for a set of pseudocomponents of a formation fluid.

42. The computer processing system of claim 41, wherein said set of pseudocomponents includes a heavy pseudocomponent representing asphaltenes in the formation fluid, a second distillate pseudocomponent that represents a non-asphaltene liquid fraction of the formation fluid, and a third light pseudocomponent that presents gases in the formation fluid.

43. The computer processing system of claim 41, wherein said set of pseudocomponents represents single carbon number (SCN) components as well as other fractions of the formation fluid.

44. The computer processing system of claim 39, wherein solving the equation of state comprises predicting compositional gradients with depth based at least partially on at least one factor selected from the group consisting of gravitational forces, chemical forces, and thermal diffusion.

45. The computer processing system of claim 39, wherein deriving the second model comprises characterizing asphaltene concentration as a function of depth as derived from the equation of state to generate a concentration profile of asphaltene pseudocomponents and corresponding aggregate size of asphaltenes as a function of location in the formation.

46. The computer processing system of claim 45, wherein the asphaltene pseudocomponents comprise asphaltene nanoaggregates and larger asphaltene clusters.

47. The computer processing system of claim 39, wherein deriving the second model comprises using the characterization of asphaltene concentration as a function of depth as derived from the equation of state to predict gradients for at least one particular fluid property that relates to asphaltene content, the particular fluid property selected from the group consisting of fluid density and fluid viscosity.

48. The computer processing system of claim 27, wherein the reservoir simulation model is based at least in part on an equation of state that characterizes asphaltene concentration as a function of location in the formation.

49. The computer processing system of claim 48, further comprising extending the equation of state for the reservoir simulation model to characterize asphaltene precipitation in order to assess potential flow assurance problems.

50. The computer system of claim 27, wherein the first model has a first grid system, and the reservoir simulation model has a second grid system that is coarser than said first grid system.

51. The computer processing system of claim 27, wherein the operations further comprise determining a reservoir development plan based on the simulation of fluid flow in the reservoir simulation model.

* * * * *